(12) United States Patent
Green et al.

(10) Patent No.: US 12,181,602 B2
(45) Date of Patent: Dec. 31, 2024

(54) SYSTEMS AND METHODS OF CALIBRATING A RANGE MEASUREMENT SYSTEM

(71) Applicant: Hitachi Rail GTS Canada Inc., Toronto (CA)

(72) Inventors: Alon Green, Toronto (CA); Kevin Tobin, Toronto (CA); Marco De Thomasis, Toronto (CA)

(73) Assignee: Hitachi Rail GTS Canada Inc., Toronto (CA)

( * ) Notice: Subject to any disclaimer, the term of this patent is extended or adjusted under 35 U.S.C. 154(b) by 249 days.

(21) Appl. No.: 17/649,649

(22) Filed: Feb. 1, 2022

(65) Prior Publication Data
US 2022/0244350 A1    Aug. 4, 2022

Related U.S. Application Data

(60) Provisional application No. 63/144,271, filed on Feb. 1, 2021.

(51) Int. Cl.
*G01S 7/40*   (2006.01)
*B61K 13/00*  (2006.01)
*G01S 13/931* (2020.01)

(52) U.S. Cl.
CPC .............. *G01S 7/40* (2013.01); *B61K 13/00* (2013.01); *G01S 13/931* (2013.01); *G01S 2013/9328* (2013.01)

(58) Field of Classification Search
CPC ........ G01S 13/74; G01S 13/75; G01S 13/931; G01S 2013/9328; G01S 7/40; G01S 7/4065
See application file for complete search history.

(56) References Cited

U.S. PATENT DOCUMENTS

| | | | |
|---|---|---|---|
| 5,420,883 A | 5/1995 | Swensen et al. |
| 6,666,411 B1 | 12/2003 | Hart et al. |
| 6,799,097 B2 | 9/2004 | Villarreal Antelo et al. |

(Continued)

FOREIGN PATENT DOCUMENTS

| | | |
|---|---|---|
| EP | 2793041 A1 | 10/2014 |
| EP | 2951074 A2 | 12/2015 |

(Continued)

OTHER PUBLICATIONS

Jahanzeb Farooq, Member, IEEE, and José Soler, Radio Communication for Communications-Based Train Control (CBTC): A Tutorial and Survey, Sep. 1, 2017.

(Continued)

*Primary Examiner* — Timothy A Brainard
(74) *Attorney, Agent, or Firm* — Studebaker & Brackett PC

(57) ABSTRACT

Systems and method of calibrating a range measurement system for a vehicle mounted on a guideway are disclosed. In some embodiments, a method includes: measuring a first time of transmission (TOT) between a first internal component of an on-board range measurement device and a second internal component of a wayside range measurement device. The first TOT is compared with a first pre-determined time. A health of the range measurement system is determined based on a difference between the first TOT and the first pre-determined time.

14 Claims, 34 Drawing Sheets

(56) References Cited

U.S. PATENT DOCUMENTS

| | | |
|---|---|---|
| 8,924,066 B2 | 12/2014 | Fries |
| 9,156,482 B2 | 10/2015 | Kanner et al. |
| 9,296,402 B2 | 3/2016 | Backes et al. |
| 9,434,397 B2 | 9/2016 | Chung et al. |
| 9,606,224 B2 | 3/2017 | Soderi et al. |
| 9,738,294 B2 | 8/2017 | Shubs, Jr. et al. |
| 10,077,060 B2 | 9/2018 | Tonguz |
| 10,173,541 B2 | 1/2019 | Wierse et al. |
| 10,457,305 B2 | 10/2019 | Braband |
| 2004/0049327 A1 | 3/2004 | Kondratenko et al. |
| 2005/0076716 A1 | 4/2005 | Turner |
| 2009/0116572 A1 | 5/2009 | Fujita et al. |
| 2010/0258682 A1 | 10/2010 | Fries et al. |
| 2019/0054942 A1 | 2/2019 | Carlson |
| 2019/0071106 A1 | 3/2019 | Carlson |
| 2019/0225246 A1 | 7/2019 | Garmson |
| 2019/0263357 A1* | 8/2019 | Golsch .................... H04W 4/04 |
| 2019/0380170 A1 | 12/2019 | Bode et al. |
| 2019/0391252 A1 | 12/2019 | Waheed et al. |
| 2020/0229124 A1* | 7/2020 | Soriaga ............... H04L 43/0864 |

FOREIGN PATENT DOCUMENTS

| | | |
|---|---|---|
| EP | 2995970 A1 | 3/2016 |
| EP | 3083366 A1 | 10/2016 |
| IN | 00570DE2012 A | 12/2015 |
| WO | 2004040327 | 5/2004 |
| WO | 2019091772 | 5/2019 |
| WO | 2020021282 | 1/2020 |

OTHER PUBLICATIONS

Shi Pu* and Jian-Hong Hao, Integrative Modeling of Wireless RF Links for Train-to-Wayside Communication in Railway Tunnel, Apr. 1, 2012.

Daizhong Yu, Guangrong Yue, Member, IEEE, Ning Wei, Member, IEEE, Lin Yang, Member, IEEE, Hongcheng Tan, Dan Liang, and Youhua Gong, Empirical Study on Directional Millimeter-Wave Propagation in Railway Communications Between Train and Trackside, Dec. 20, 2020.

Marc Heddebaut, Leaky Waveguide for Train-to-Wayside Communication-Based Train Control, Mar. 1, 2009.

International Search Report and Written Opinion issued in corresponding International Application No. PCT/IB2022/050877, dated Jun. 3, 2022, pp. 1-9, Canadian Intellectual Property Office, Quebec, Canada.

Partial Supplementary European Search Report issued in corresponding European Application No. 22745497.2, dated Jun. 19, 2024, pp. 1-25, European Patent Office, Munich, Germany.

The extended European search report issued by the European Patent Office on Nov. 13, 2024, which corresponds to European Patent Application No. 22745497.2-1206 and is related to U.S. Appl. No. 17/649,649.

* cited by examiner

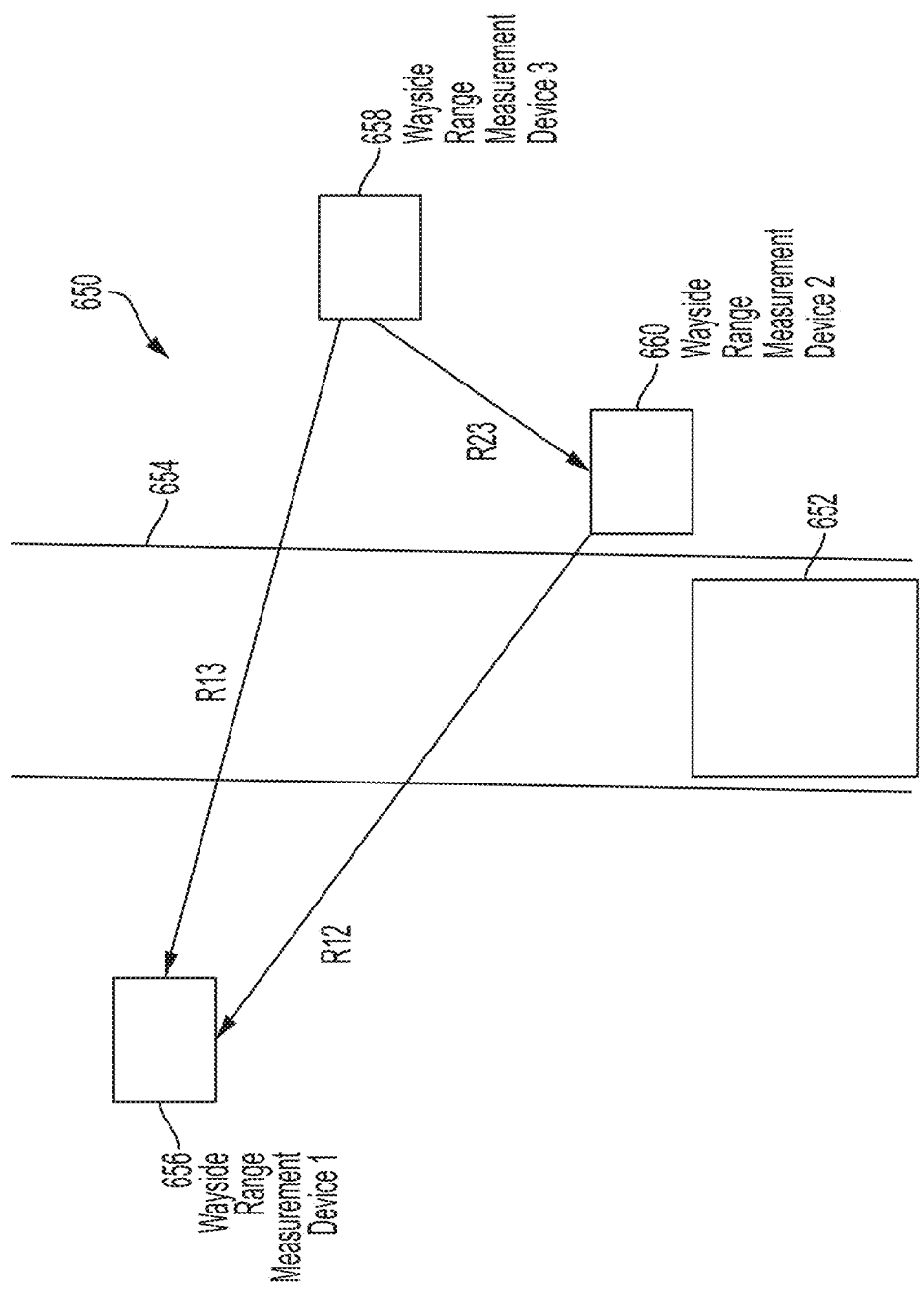

SYSTEMS AND METHODS OF CALIBRATING A RANGE MEASUREMENT SYSTEM

PRIORITY CLAIM

The present application claims the priority of U.S. Provisional Application No. 63/144,271, filed Feb. 1, 2021, which is incorporated herein by reference in its entirety.

BACKGROUND

Vehicles that travel over a wide variety of locations and environments face challenges: determining the current location of the vehicle, tracking the location of the vehicle as the vehicle moves, and/or accurately determining the speed of the vehicle. Inconsistencies in manufacturing and the effects of use sometimes affect the ability to track the location of the vehicle.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 6A-6I are a top view of wayside components in a range measurement system, in accordance with some embodiments.

DETAILED DESCRIPTION

Figure 1A:
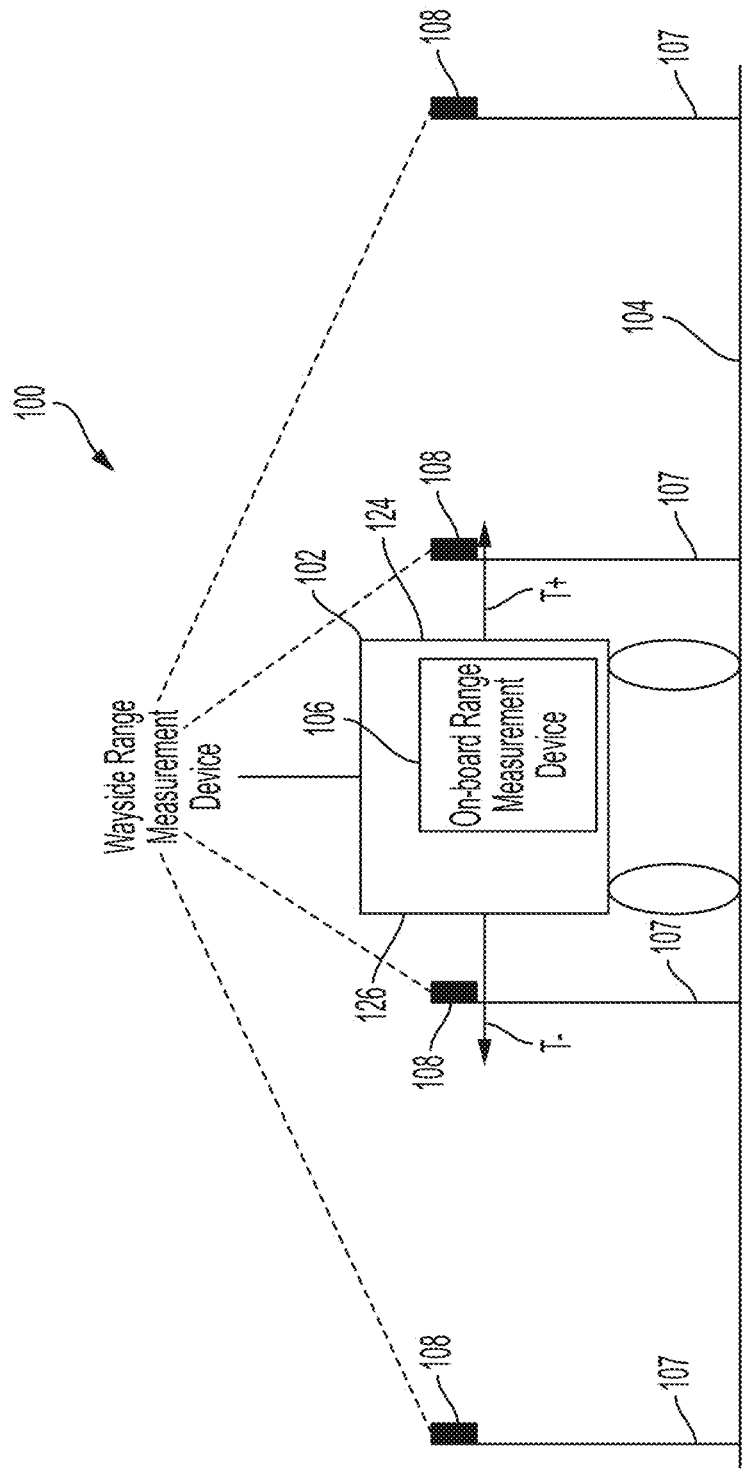
FIG. 1A-1C depict a high-integrity range measurement system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

For a system to be rated as Safety Integrity Level (SIL) 4, the system is required to have demonstrable on-demand reliability, and techniques and measurements to detect and react to failures that may compromise the system's safety properties. SIL 4 is based on International Electrotechnical Commission's (IEC) standard IEC 61508 and EN standards 50126 and 50129. SIL 4 requires the probability of failure per hour to range from 10-8 to 10-9.

Systems and methods of calibrating a range measurement system are disclosed. To more accurately measure the range between an on-board range measurement device and a wayside range measurement device, the effect of the delay caused by the internal components of the on-board range measurement device and the wayside range measurement device are accounted for so that time measurements more accurately reflect the propagation time of wireless signals between antennas of the on-board range measurement device and the wayside range measurement device. The systems and methods disclosed herein transmit signals between the on-board range measurement device and the wayside range measurement device and compare expected travel times with measured travel times to see if the expected and measured values are within error ranges. In some embodiments, signals are transmitted via different signal routes to determine if the difference in measured travel time between the different signal routes are within expected margins. In some embodiments, the travel times along a signal route are simply compared with expected travel times to determine if the travel times are within expected margins. If the travel times are within expected margins, the range measurement system is considered to be calibrated. If not, calibration procedures are performed and/or alarms are sounded to indicate that the range measurement system is not calibrated. In at least some embodiments, if the travel times are not within expected margins, calibration procedures are performed and/or alarms are sounded to indicate that calibration of the range measurement system should be performed FIG. 1A is a side view of a high-integrity range measurement system 100, in accordance with some embodiments.

A guideway mounted vehicle 102 moves along a guideway 104 such as a track, rail, monorail, road, or the like. The vehicle 102 is a train, subway, monorail, or another path-constrained vehicle, including automobiles or buses that have been configured to move along a constrained path. The vehicle 102 has a first end 124 and a second end 126 distal from the first end. On-board components of the high integrity range measurement system 100 are on or in the vehicle 102. The high integrity range measurement system 100 includes at least one on-board range measurement device 106. In some embodiments, the on-board range measurement device 106 is a Global Positioning System (GPS), Wi-Fi device, 802.11 compliant communication device (e.g., LTE or 5G device), ultra wideband (UWB) device, radio detection and ranging (radar) or Light Detection and Ranging (LiDAR) which measure the range to a location 107. At least one wayside range measurement device 108 is located at each location 107. The wayside range measurement devices 108 at each location 107 are passive, in some embodiments and active, in some embodiments. In some embodiments, some of the wayside range measurement devices 108 are active and some of the wayside range measurement device 108 are passive. In some embodiments, the on-board range measurement device 106 is referred to as the "tag."

In FIG. 1A, the vehicle either moves in a direction normal to end 124 (direction T+) or moves in a direction (T−) located at another end 126 of the vehicle 102. The end 124 is opposite to end 126.

Various locations 107, each having at least one of the wayside measurement devices 108, have been set up along a wayside of the guideway 104. In some embodiments, the on-board range measurement device 106 is configured to transmit or receive a signal to/from a wayside range measurement device 108 as the vehicle 102 is approaching a location 107. In some embodiments, the wayside range measurement device 108 is an active landmark that includes one or more of a GPS device, an 802.11 compliant communication device (e.g., LTE or 5G device), or a UWB device. In some embodiments, the wayside range measurement device 108 is referred to as the "anchor." In some embodiments, the locations 107 are at regularly spaced intervals along the wayside of the guideway 104. In other embodiments, the locations 107 are not at regularly spaced intervals along the wayside of the guideway 104.

In some embodiments, the wayside range measurement device 108 is configured to transmit or receive a signal to/from the on-board range measurement device 106 as the vehicle 102 is approaching a location 107. A range from the location 107 is obtained based on the signal received and/or transmitted by the on-board range measurement device 106 and/or wayside range measurement device 108.

For example, in some embodiments, the on-board range measurement device 106 is configured to transmit a first signal to the wayside range measurement device 108 at the particular location. After the wayside range measurement device 108 receives the first signal, the wayside range measurement device 108 transmits a second signal to the on-board range measurement device 106. A range of the vehicle 102 is determined based on the time of transmission (TOT) of the first signal and the second signal. In some embodiments, a position of the particular location 107 is known based on the particular wayside range measurement device 108. As such, a position of the vehicle is determined based on the position of the location 107 and the TOT of the first and second signal.

In other embodiments, the wayside range measurement device 108 is passive and does not generate a second signal. In this case, the range of the vehicle 102 is determined based on the TOT of the first signal propagating from the on-board range measurement device 108 to the wayside range measurement device 108 and the reflected first signal propagating from the wayside range measurement device 108 to the on-board range measurement device 106.

In some embodiments, the wayside range measurement device 108 is configured to transmit a first signal to the on-board range measurement device 106 at the particular location. After the on-board range measurement device 106 receives the first signal, the on-board range measurement device 106 transmits a second signal to the wayside range measurement device 108. A range of the vehicle 102 is determined based on the TOT of the first signal and the second signal. In some embodiments, a position of the particular location 107 is known based on the particular wayside range measurement device 108. As such, a position of the vehicle is determined based on the position of the location 107 and the TOT of the first and second signal.

Each range measurement device 106, 108 includes at least one Microcontroller Unit (MCU)/Central Processing Unit (CPU), one or more coaxial cables either directly or indirectly connected to at least one of the MCU/CPU(s), and one or more antennas that are either directly or indirectly connected to at least one of the coaxial cable(s). To appropriately determine the position of the vehicle 102, the temporal delay for a signal to travel from the MCU/CPU to the antenna of the range measurement device 106, 108 needs to be known so that it can be removed from the total TOT to produce the actual Time of Flight (TOF) from which the range is calculated. Thus, in order to get an accurate range measurement based on the signals transmitted to and from the range measurement devices 106, 108, the temporal delay between the internal components of the range measurement devices 106, 108 has to be accurately determined. If the temporal delay is assumed to be a particular time value but the actual temporal delay is a time value having a difference with the assumed time value that is outside of a selected error range, the range of the vehicle 102 to the particular location 107 will not be accurately measured based on the TOT. In some embodiments, the error range is 10 cm divided by c, the speed of light. In some embodiments, high accuracy is used in locations where position is initialized to prevent dilution of precision (i.e., confusion between two nearby parallel tracks, in stations, or in a switch zone). In some embodiments, lower accuracy (e.g., 1 m error range) is sufficient in the inter station operation when position is already established.

Accordingly, the appropriate calibration of temporal delay for a signal to travel within the internal components of the range measurement devices 106, 108 is determined in order for the high-integrity range measurement system 100 to accurately measure a range to a particular location. In some embodiments, a system check is performed on the range measurement devices 106, 108 by placing the vehicle 102 at a known position from a wayside measurement device 108. A total TOT with a calibrated time delay for the signal to propagate through the internal components of the range measurement devices 106, 108 is known at the pre-determined known position. The total signal propagation time at the known location is then actually measured using the range measurement devices 106, 108. The measured signal propagation time and the known propagation time are then compared to determine if the range measurement devices 106, 108 are appropriately calibrated.

Because the speed of the signals is known, i.e., the speed of light, and the distance between the range measurement devices 106, 108 is known at the pre-determined position, the difference between the measured TOT and the pre-determined calibrated time delay reflects a difference in propagation times between internal components of the range measurement devices 106, 108. If the difference is above a threshold, the range measurement system 100 should be calibrated. If the difference is below a threshold, the range measurement system 100 does not need to be calibrated.

Figure 1B:
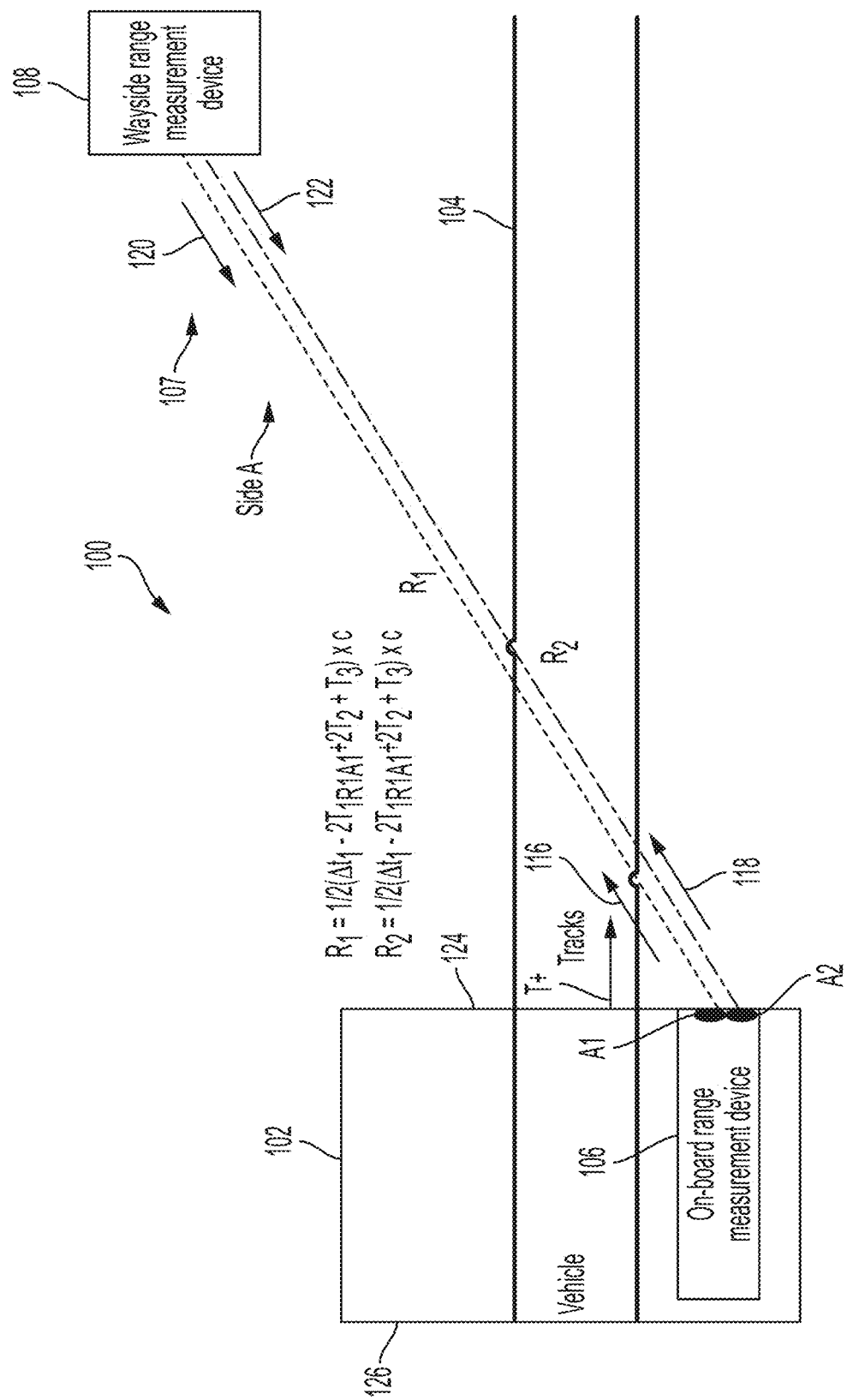

FIG. 1B is a top view of one example of the range measurement system 100 shown in FIG. 1A, in accordance with some embodiments.

In FIG. 1B, the on-board range measurement device 106 is configured to generate a signal 116. In FIG. 1B, the on-board range measurement device 106 includes an antenna A1 and an antenna A2, which are displaced from each other but in/on the vehicle 102. The on-board range measurement device 106 is configured to wirelessly transmit the signal 116 from antenna A1 to the wayside range measurement device 108 at the location 107. The on-board range measurement device 106 is configured to wirelessly transmit the signal 118 from antenna A2 to the wayside range measurement device 108 at the location 107. The wayside range measurement device 108 is configured to wirelessly transmit the signal 120 to the on-board range measurement device 106 in response to receiving the signal 116. The wayside range measurement device 108 is configured to wirelessly transmit the signal 122 to the on-board range measurement device 106 in response to receiving the signal 118. Because the on-board range measurement device 106 initiates the signal transmission and the wayside range measurement device 108 responds to the signals from the on-board range measurement device 106, the on-board range measurement device 106 is referred to as the "initiating device" and the wayside range measurement device 108 is the "responding device." In other embodiments, the wayside range measurement device 108 initiates the signal transmission and the on-board range measurement device 106 responds to the signals from the wayside range measurement device 108. In this alternative circumstance, the wayside range measurement device 108 would be the initiating device and the on-board range measurement device 106 would be the responding device.

In FIG. 1B, the wayside range measurement device 108 is on side A, which is to the left of the guideway 104 relative to the direction T+. The distance that the signals 116, 120 travel wirelessly between the antenna A1 of the on-board range measurement device 106 and the antenna (not explicitly shown) of the wayside range measurement device 108 is the distance $R_{1expected}$. The distance that the signals 118, 122 travel wirelessly between the antenna A2 of the on-board range measurement device 106 and the antenna of the wayside range measurement device 108 is the distance $R_{2expected}$. $R_{1measured}$ is the distance measured between the antenna A1 of the on-board range measurement device 106 and the antenna (not explicitly shown) of the wayside range measurement device 108. $R_{2measured}$ is the distance measured between the antenna A2 of the on-board range measurement device 106 and the antenna (not explicitly shown) of the wayside range measurement device 108.

The equations for $R_{1measured}$ and $R_{2measured}$ are:

$$R_{1measured} = \tfrac{1}{2}(\Delta t_1 - 2T_{1R1A1} - 2T_2 - T_3) \times c$$

$$R_{2measured} = \tfrac{1}{2}(\Delta t_1 - 2T_{1R1A2} 12T_2 1T_3) \times c$$

The time of transmission (TOT), which in the equations above is provided as $\Delta t1$ is the amount of time for signal propagation between generation of the initiating signal 116, 118 of the MCU/CPU of the initiating device until a response signal 120, 122 is received by the MCU/CPU of the initiating device (e.g., the wayside range communication device 108, the on-board range communication device 106). In the embodiment below, the TOT is a function of the time delays and propagation times as provided in the equation below.

$$\Delta t1 = TOF + 2T1 + 2T2 + T3$$

T1 is the signal propagation time between the MCU/CPU and the antenna (typically through coax cable) of the initiating device. In this case, the initiating device is the on-board range measurement device 106. T1 is T1R1A1 for the propagation time of signals 116, 120 between the antenna A1 and the MCU/CPU of the initiating device. T1 is T1R1A2 for the propagation time of signals 118, 122 between the antenna A2 and the MCU/CPU of the initiating device. In either case, TOT includes 2*T1 for the propagation time of the initiating signal 116, 118 from the MCU/CPU to the antenna (e.g., A1 and A2) of the initiating device and for the propagation time of the responding signal 120, 122 from the antenna to the MCU/CPU of the initiating device.

Time of Flight (TOF) is the signal propagation time (typically in the air) from the antenna of the initiating device to the antenna of the responding device and from the antenna of the responding device to the initiating device.

T2 is the signal propagation time between the antenna (not shown) and the MCU/CPU (typically through a coax cable) of the responding device (T2). In this example, the receiving device is the wayside range measurement device 108. TOT includes 2*T2 for the propagation time of the initiating signal 116, 118 from the MCU/CPU to the antenna of the responding device and for the propagation time of the responding signal 120, 122 from the antenna to the MCU/CPU of the responding device.

T3 is the processing time in the responding device.

TOF is based on the known distance at the pre-determined location and the speed of light. Thus, $\Delta t1$ is measured to determine a $\Delta t1_{measured}$. A pre-determined and known $\Delta t1$ is also determined, which is the value of $\Delta t1$ when the internal components of the range measurement system 100 are calibrated at the known distance (e.g., $R_{1expected}$, $R_{2expected}$). This corresponds to $\Delta t1_{calibrated}$. $\Delta t1_{measured}$ is compared to $\Delta t1$ calibrated. In some embodiments, $R_{1measured}$ and $R_{2measured}$ are compared. If the difference between $R_{1measured}$ and $R_{2measured}$ is greater than a threshold, then the range measurement system is in error. As such, the system is checked to find components (such as coaxial cables) that are not operating as expected. Next, $R_{1measured}$ and $R_{2measured}$ are checked individually.

For both $R_{1measured}$ and $R_{2measured}$, if the difference between $\Delta t1$ measured and $\Delta t1$ calibrated is larger than a threshold, then the internal components of the range measurement system 100 are not calibrated. In this case, a calibration procedure is performed. If the difference between Δt1measured and Δt1calibrated is less than the threshold, then the internal components of the range measurement system 100 are calibrated and a calibration procedure is not performed.

Time accuracy=Range accuracy/c.

In some embodiments, if 1 cm accuracy is used then the time accuracy must be better than 3×10-11 sec. In some embodiments, if 1 m accuracy is needed then the time accuracy must be better than 3×10-9 sec.

The wayside range measurement devices 108(1), 108(2) are static and their location on the map is known. Accordingly, the range between any pair of wayside range measurement devices 108(1), 108(2) is known with high degree of accuracy and doesn't change. A range between the pair of wayside range measurement devices 108(1), 108(2) is measured and compared with the known range. If the range measurement is within the error tolerance then the wayside range measurement devices 108(1), 108(2) are healthy. If the wayside range measurement devices 108(1), 108(2) are healthy then then a range measurement between the on-board range measurement device 106 and the wayside range measurement devices 108(1), 108(2) that is outside the acceptable error tolerance result in knowing that the on-board range measurement device 106 is uncalibrated. However, if the range measurement between the range measurement devices 108(1), 108(2) is outside the acceptable error tolerance, but only one of the range measurements between the on-board measurement device 106 and the wayside range measurement device 108(1), 108(2) is within the error tolerance while the other is not, then the wayside range measurement device 108(1), 108(2) with the range measurement outside the error tolerance is known to be uncalibrated.

For example, if the $\Delta t1_{measured}$ for the signals 116, 120 do not correspond to the known distance $R_{1expected}$, then the internal components between the MCU/CPU and antenna A1 of the on-board range measurement device 106 and the antenna and the MCU/CPU of the wayside range measurement device 108 are not calibrated. Thus, a calibration is performed or an indicator is generated to indicate that a calibration is to be performed. In some embodiments, the indicator is an alarm that is sounded to indicate that a calibration is to be performed. In other embodiments, the indicator is an alarm sent to maintenance terminal or to central control to indicate that a calibration is to be performed. Similarly, if the $\Delta t1_{measured}$ for the signals 118, 122 do not correspond to the known distance $R_{2expected}$, then the internal components between the MCU/CPU and antenna A2 of the on-board range measurement device 106 and the antenna and the MCU/CPU of the wayside range measurement device 108 are not calibrated. Thus, a calibration is performed or an alarm is sounded, or sent to maintenance terminal or central control, to indicate that a calibration is to be performed.

Figure 1C:
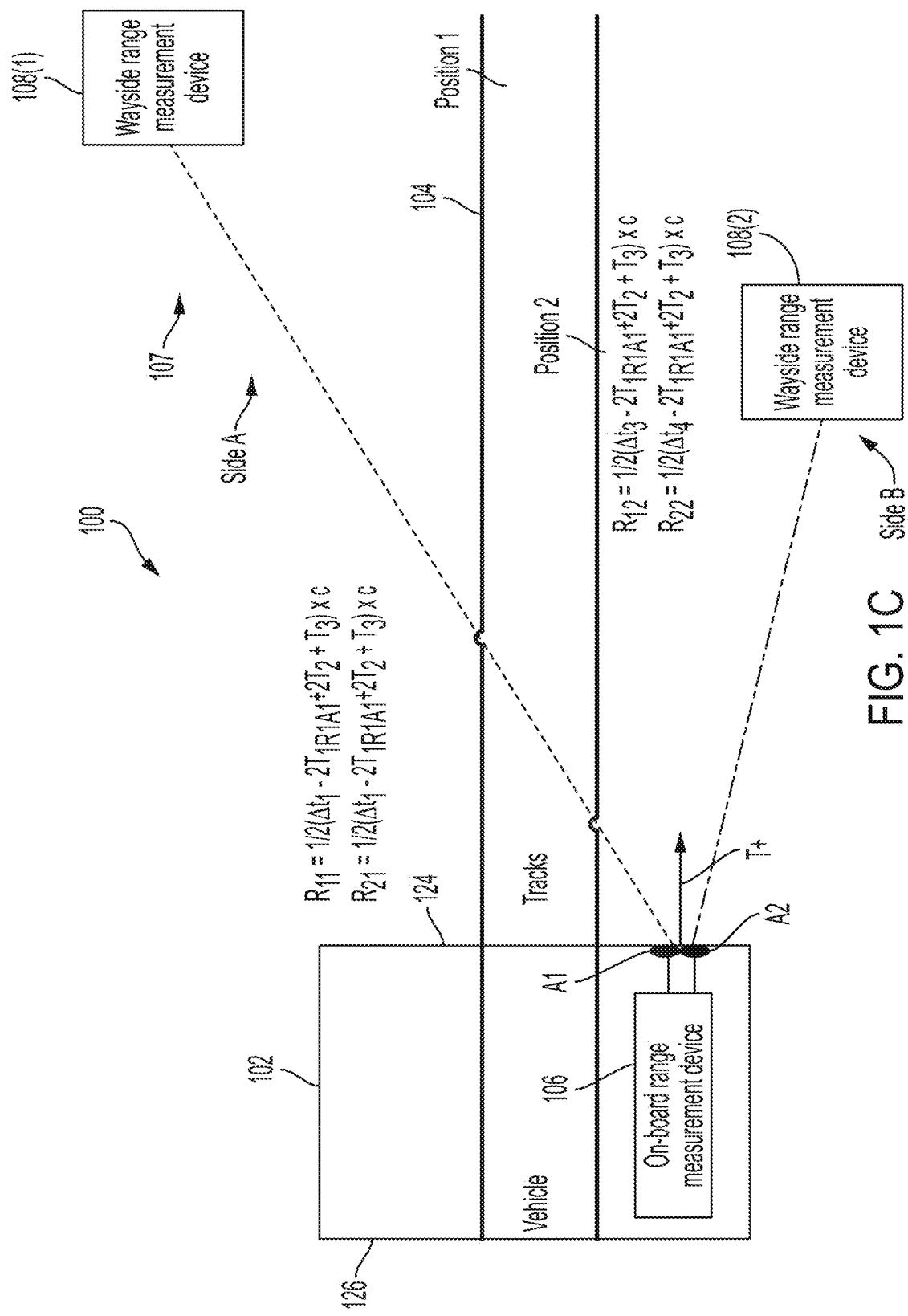

FIG. 1C is a top view of another example of the range measurement system 100 shown in FIG. 1A.

FIG. 1C illustrates the range measurement system 100 at a different location 107 than at the location 107 shown in FIG. 1B. The range measurement system 100 thus includes the same on-board range measurement device 106 described above with respect to FIG. 1B. However, at the location shown in FIG. 1C, the location 107 includes a wayside range measurement device 108(1) and a wayside range measurement device 108(2).

The wayside range measurement device 108(1) has a position (1) relative to the guideway 104 and is located on side A. The wayside range measurement device 108(2) has a position (2) relative to the guideway 104 and is located on side B. Side B is on the opposite side of the guideway as side A and is thus to the right relative to the direction (T+). Position (2) is before position (1) relative to the position of the vehicle 102 and the direction (T+), i.e., position (2) is closer to the vehicle 102 than position (1).

On-board range measurement device 106 is configured to determine $R_{1measured}$ and $R_{2measured}$ and thus $\Delta t1_{measured}$, $\Delta t1_{calibrated}$ with respect to wayside range measurement device 108(1) in the same manner described above with respect to wayside range measurement device 108 in FIG. 1B.

On-board range measurement device 106 is configured to determine $R_1$ and $R_2$ and thus $\Delta t1_{measured}$, $\Delta t1_{calibrated}$ with respect to wayside range measurement device 108(2) in the same manner described above with respect to wayside range measurement device 108 in FIG. 1B. Accordingly, calibration is performed on multiple wayside range measurement devices 108(1), 108(2) at the particular location 107 of FIG. 1C.

Figure 2:
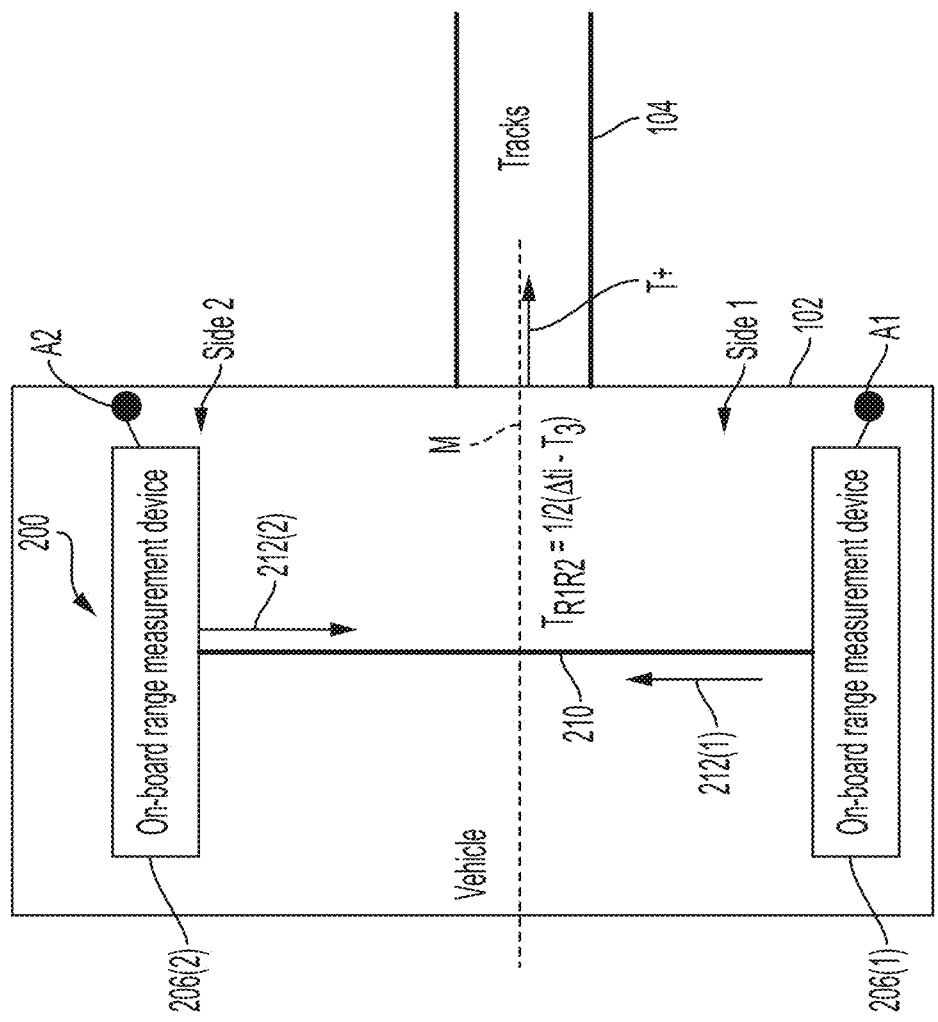
FIG. 2 is a top view of on-board components of a range measurement system for the vehicle 102, in accordance to some embodiments.

FIG. 2 is a top view of on-board components 200 of a range measurement system for the vehicle 102, in accordance with some embodiments.

The on-board components 200 are the on-board components of the range measurement system 100 shown in FIG. 1A, in accordance with some embodiments. The on-board components 200 include an on-board range measurement device 206(1) and an on-board range measurement device 206(2). The on-board range measurement device 206(1) is connected to the antenna A1 and to the antenna A2 through the on-board range measurement device 206(2). The on-board range measurement device 206(1) detects whether calibration is to be performed and performs calibration procedures in the same manner as on-board range measurement device 106 in FIG. 1B. The antenna A1 corresponds with the antenna A1 in FIG. 1B and the antenna A2 corresponds with the antenna A2 in FIG. 1B. Thus, with respect to a wayside range measurement device, such as wayside range measurement device 108 in FIG. 1B, the on-board range measurement device 206(1) is configured to transmit the signal 116 (See FIG. 1B) from the antenna A1, receive the signals 120 (See FIG. 1B) from the antenna A1, transmit the signal 118 (See FIG. 1B) to the antenna A2, and receive the signal 122 (See FIG. 1B) from the antenna A2. In this manner, the on-board range measurement device 206(1) is configured to determine the TOT from the antenna A1 and the TOT from the antenna A2. The on-board range measurement device 206(1) is configured to determine whether calibration is to be performed as described above with respect to FIG. 1B.

The on-board range measurement device 206(2) is connected to the antenna A1 through the on-board range measurement device 206(1) and to the antenna A2. The on-board range measurement device 206(2) detects whether calibration is to be performed and performs calibration procedures in the same manner as on-board range measurement device 106 in FIG. 1B. Thus, with respect to a wayside range measurement device, such as wayside range measurement device 108 in FIG. 1B, the on-board range measurement device 206(2) is configured to transmit the signal 116 (See FIG. 1B) from the antenna A1, receive the signals 120 (See FIG. 1B) from the antenna A1, transmit the signal 118 (See FIG. 1B) to the antenna A2, and receive the signal 122 (See FIG. 1B) from the antenna A2. In this manner, the on-board range measurement device 206(2) is configured to determine the TOT from the antenna A1 and the TOT from the antenna A2. The on-board range measurement device 206(2) is configured to determine whether calibration is to be performed as described above with respect to FIG. 1B.

In this embodiment, the on-board range measurement device 206(1) is mounted to side 1 of the vehicle 102 and on-board range measurement device 206(2) is mounted to side 2 of the vehicle. Side 1 is to the right of midline M when facing the direction of travel T+, where midline M is parallel to the direction of travel T+. Side 2 is to the right of midline M when facing the direction of travel T+.

In FIG. 2, a coaxial cable 210 connects the on-board range measurement device 206(1) to the on-board range measurement device 206(2). The MCU/CPU (not shown) of the on-board range measurement device 206(1) is configured to generate a signal 212(1) that propagates through the coaxial cable 210 to the MCU/CPU (not shown) of the on-board range measurement device 206(2). The MCU/CPU (not shown) of the on-board range measurement device 206(2) is configured to generate a signal 212(2) that propagates through the coaxial cable 210 to the MCU/CPU (not shown) of the on-board range measurement device 206(1). In some embodiments, the on-board range measurement device 206(1) generates and transmits the signal 212(1) first and the on-board range measurement device 206(2) generates and propagates the signal 212(2) in response. In some embodiments, the on-board range measurement device 206(2) generates and transmits the signal 212(2) first and the on-board range measurement device 206(1) generates and propagates the signal 212(1) in response. Regardless, a total propagation delay Δti is measured from the transmission of the first one of the signals 212(1), 212(2) from the MCU/CPU of the initiating one of the on-board range measurement devices 206(1), 206(2) to the MCU/CPU of the responding one of the on-board range measurement devices 206(2), 206(1) and of the second one of the signals 212(2), 212(1) to the MCU/CPU of the initiating one of the on-board range measurement devices 206(1), 206(2). The propagation delay TR1R2 is the propagation delay from one of the MCU/CPUs to the other MCU/CPU through the coaxial cable 210. If the total propagation delay Δti is measured by one of the on-board range measurement devices 206(1), 206(2), then the measured propagation delay TR1R2 is determined from the formula:

$$TR1R2_{measured} = \frac{1}{2}(\Delta ti - T3),$$

where T3 is the processing time for the responding one of the MCU/CPUs to generate the responding one of the signals 212(2), 212(1). In some embodiments, the measured propagation delay $TR1R2_{measured}$ is compared directly to pre-determined calibrated propagation delay $TR1R2_{calibrated}$ of the coaxial cable 210. If the difference between $TR1R2_{measured}$ and $TR1R2_{calibrated}$ is less than a threshold value, then the coaxial cable 210 is calibrated. However, if the difference between $TR1R2_{measured}$ and $TR1R2_{calibrated}$ is greater than a threshold value, then calibration procedures are performed for the coaxial cable 210. In some embodiments, the measuring one of the on-board range measurement devices 206(1), 206(2) is configured to multiply the measured propagation delay $TR1R2_{measured}$ with the speed of light so that:

$$TR1R2_{measured} * c = R_{cablemeasured}$$

The measured cable length $R_{cablemeasured}$ is compared to a pre-determined cable length $R_{calibrated}$ for the coaxial cable 210. If the difference between $R_{cablemeasured}$ and $R_{calibrated}$ is less than a threshold value, then the coaxial cable 210 is calibrated. However, if the difference between $R_{cablemeasured}$ and $R_{calibrated}$ is greater than a threshold value, then calibration procedures are performed for the coaxial cable 210. In this case, the propagation delay $TR1R2_{measured}$ and propagation delay $TR1R2_{calibrated}$ are being measured indirectly.

Figure 3:
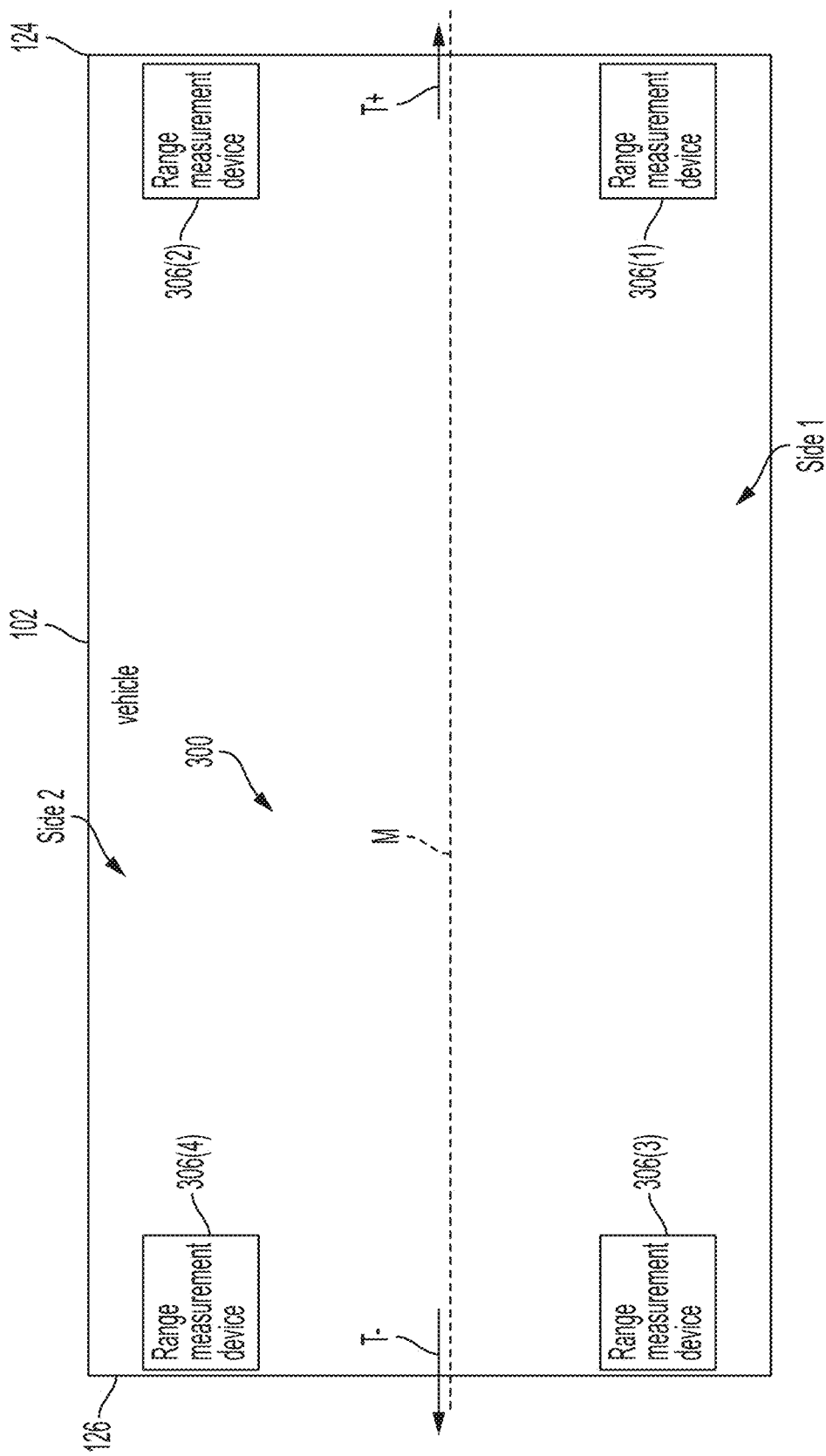
FIG. 3 is a top view of on-board components of a range measurement system, in accordance to some embodiments.

FIG. 3 is a top view of on-board components 300 of a range measurement system, in accordance to some embodiments.

The on-board components 300 are the on-board components of the range measurement system 100 shown in FIG. 1A, in accordance with some embodiments. In FIG. 3, the on-board components 300 in the vehicle 102 include on-board range measurement device 306(1), on-board range measurement device 306(2), on-board range measurement device 306(3), and on-board range measurement device 306(4). On-board range measurement device 306(1) is located in the vehicle 102 at end 124 and side 1. On-board range measurement device 306(2) is located in the vehicle 102 at end 124 and side 2. On-board range measurement device 306(3) is located in the vehicle 102 at end 126 and side 1. On-board range measurement device 306(4) is located in the vehicle 102 at end 126 and side 2.

Each of the on-board range measurement devices 306(1), 306(2), 306(3), 306(4) are configured to detect whether calibration is to be performed and to perform calibration in the same manner as on-board range measurement device 106 in FIG. 1B, in accordance with some embodiments. In some embodiments, a pair of antennas (not shown) is connected exclusively to every one of the on-board range measurement devices 306(1), 306(2), 306(3), 306(4) such that there are four pairs of individual antennas for each of the on-board range measurement devices 306(1), 306(2), 306(3), 306(4). In other embodiments, at least some of the on-board range measurement devices 306(1), 306(2), 306(3), 306(4) share at least some of the antennas (not shown). In some embodiments, on-board range measurement devices 306(1), 306(2) are used for range measurements when the vehicle is moving in the direction T+ while the on-board range measurement devices 306(3), 306(4) are deactivated. In some embodiments, on-board range measurement devices 306(3), 306(4) are used for range measurements when the vehicle is moving in the direction T- while the on-board range measurement devices 306(1), 306(2) are deactivated. These and other configurations are within the scope of this disclosure for the on-board components 300.

FIGS. 4A-4E are a top view of a range measurement system 400, in accordance with some embodiments.

Range measurement system 400 corresponds with the range measurement system 100 described above with respect to FIG. 1A. The range measurement system 400 is similar to the range measurement system 100 shown in FIG. 1C. The range measurement system 400 includes the wayside range measurement device 408(1) and the wayside range measurement device 408(2) described above with respect to FIG. 1. However, in FIGS. 4A-4E, the range measurement system 400 includes an on-board range measurement device 406(1) and an on-board range measurement device 406(2).

Regarding calibration procedures, the on-board range measurement device 406(1) operates in the same manner as on-board range measurement device 106 with respect to wayside range measurement device 108(1), 108(2) and as described with respect to FIG. 1B and FIG. 1C. Additionally, regarding calibration procedures, the on-board range measurement device 406(2) operates in the same manner as on-board range measurement device 106 with respect to wayside range measurement device 108(1), 108(2) and as described with respect to FIG. 1B and FIG. 1C. However, in this embodiment, the on-board range measurement device 406(1) and the on-board range measurement device 406(2) share the antenna A1 and the antenna A2. In FIG. 4A-4E, antenna A1 and antenna A2 are external to the on-board range measurement device 406(1) and the on-board range measurement device 406(2).

A coaxial cable C1P, at least one switch S1, and a coaxial cable C1T connect the on-board range measurement device 406(1) to the antenna A1. In this embodiment, the switch S1 is a single-pole double throw switch S1. The switch S1 includes a pole terminal P and throw terminal T1 and a throw terminal T2. In some embodiments, the switch S1 is formed as a transistor switch, a microelectromechanical switch, a mechanical switch, and/or the like. The coaxial cable C1P connects the on-board range measurement device 406(1) to the pole terminal P of the switch S1.

The throw terminal T1 of the switch S1 is connected by the coaxial table C1T to the antenna T1. The switch S1 is configured to selectively open and close a path from the pole terminal P of the switch S1 to the throw terminal T1 of the switch S1 and open and close a path from the pole terminal P of the switch S1 to the throw terminal T2 of the switch S1.

Figure 4A:
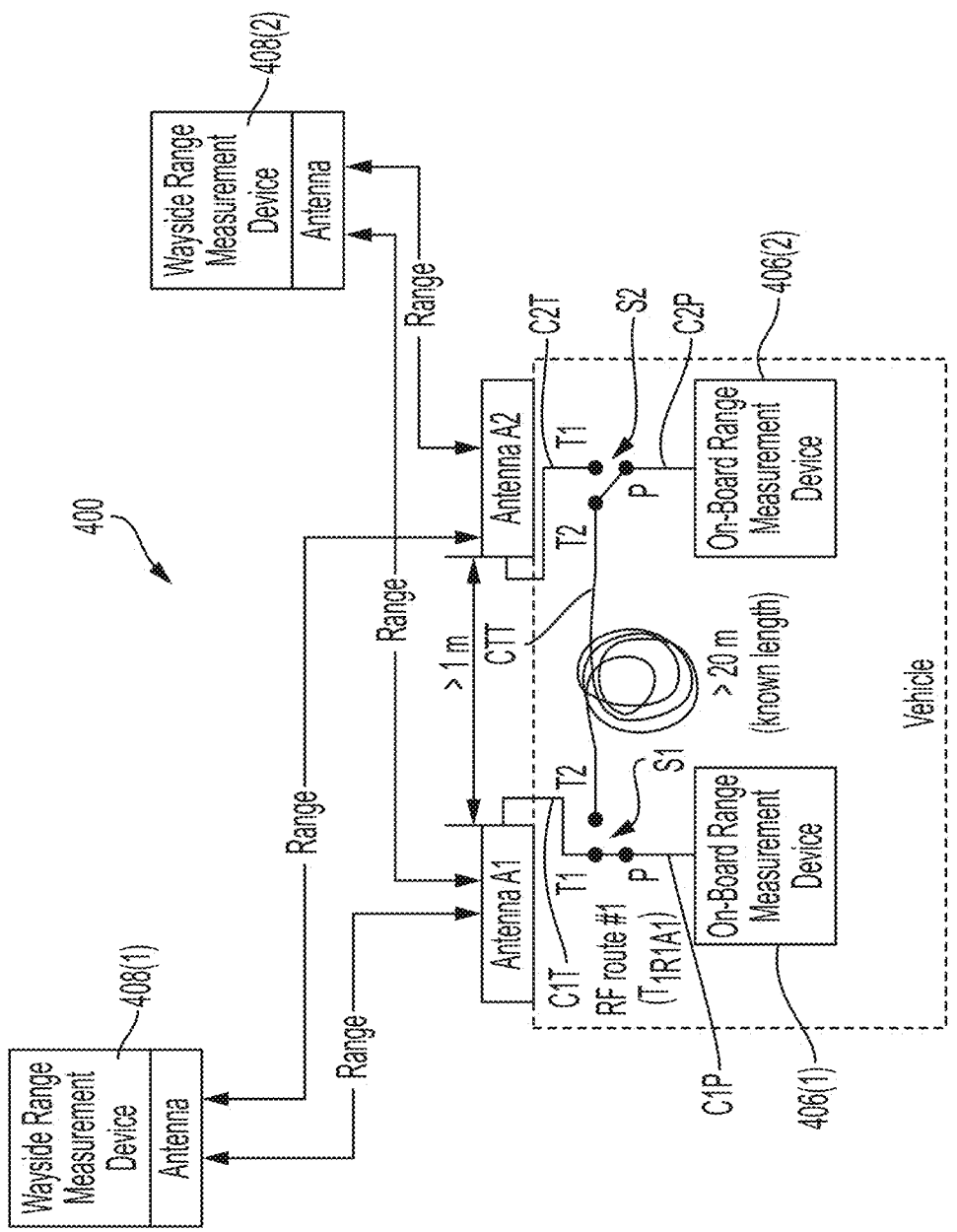
FIGS. 4A-4E are a top view of a range measurement system, in accordance with some embodiments.

When the path between the pole terminal P of the switch S1 to the throw terminal T1 of the switch S1 is closed, a signal (e.g., signals 116, 120 in FIG. 1B) propagates from the antenna A1 to the on-board range measurement device 406(1). This is shown in FIG. 4A. In this case, the TOT measured by the on-board range measurement device includes the internal delay T1R1A1, described above with respect to FIG. 1B. In this case, the T1R1A1 includes the propagation delay resulting from the MCU/CPU (not shown) of the on-board range measurement device 108 (1), through the coaxial cable C1P, the switch S1 from the pole terminal P1 to the throw terminal T1, and the coaxial cable C1T.

Figure 4B:
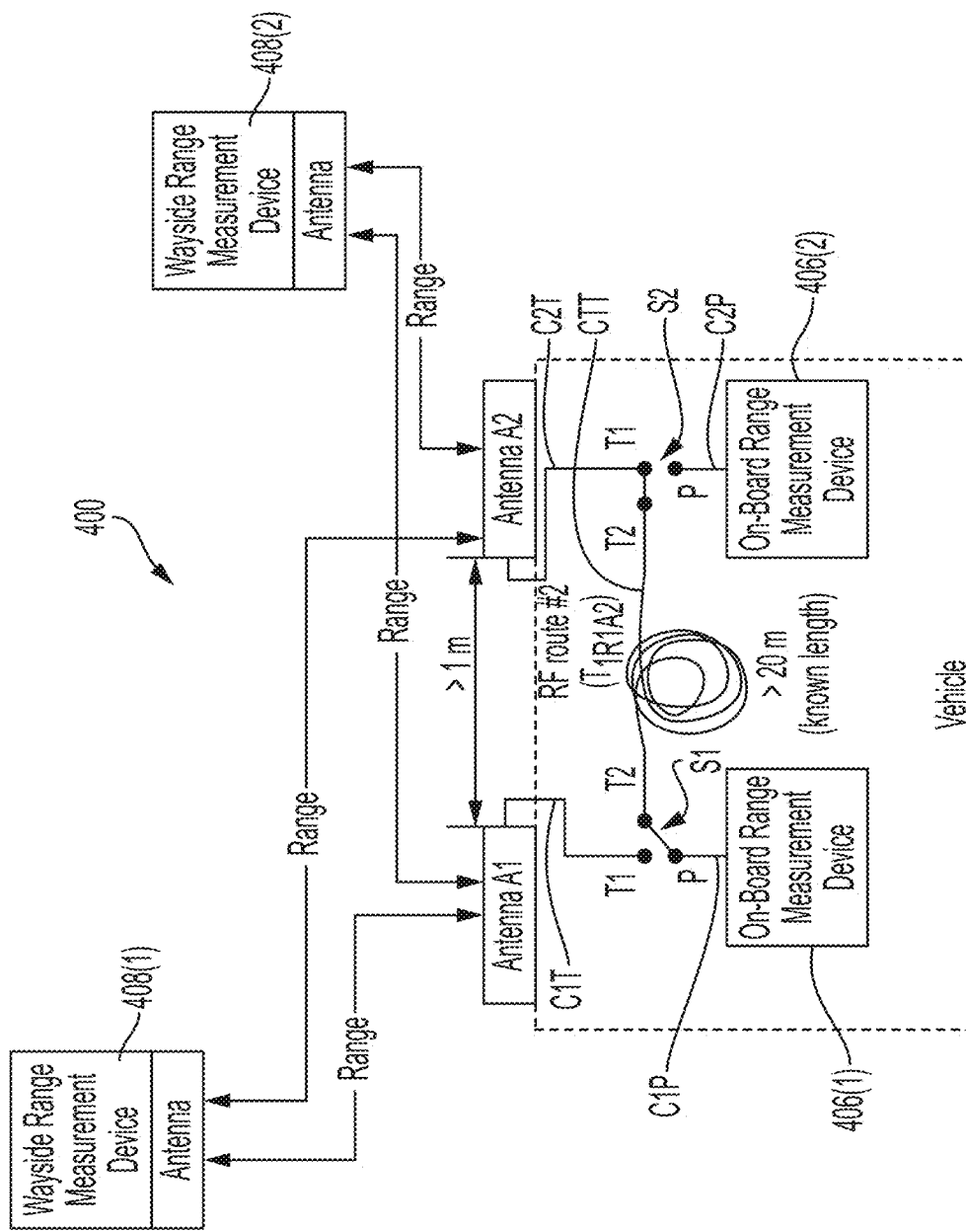

A coaxial cable C2P, at least one switch S2, and a coaxial cable C2T connect the on-board range measurement device 406(2) to the antenna A2. In this embodiment, the switch S2 is a single-pole double throw switch S2. The switch S2 includes a pole terminal P and throw terminal T1 and a throw terminal T2. In some embodiments, the switch S2 is formed as a transistor switch, a microelectromechanical switch, a mechanical switch, and/or the like. The coaxial cable C2P connects the on-board range measurement device 406(2) to the pole terminal P of the switch S2. The throw terminal T1 of the switch S2 is connected by the coaxial table C2T to the antenna T2. The switch S2 is configured to selectively open and close a path from the pole terminal P of the switch S2 to the throw terminal T1 of the switch S2 and open and close a path from the pole terminal P of the switch S2 to the throw terminal T2 of the switch S2. When the path between the pole terminal P of the switch S2 to the throw terminal T1 of the switch S2 is closed, a signal (e.g., signals 116, 120 in FIG. 1B) are configured to propagate from the antenna A2 to the on-board range measurement device 406(2). In this case, the TOT measured by the on-board range measurement device 406(2) includes the propagation delay (equivalent to T1R1A2 in FIG. 1B) resulting from the MCU/CPU (not shown) of the on-board range measurement device 408(2), through the coaxial cable C2P, the switch S2 from the pole terminal P1 to the throw terminal T1, and the coaxial cable C2T. This configuration is shown in FIG. 4D.

The coaxial cable C1P, the switch S1, a coaxial cable CTT, the switch S2, and the coaxial cable C2T connect the on-board range measurement device 406(1) to the antenna A2. The coaxial cable CTT connects the throw terminal T2 of the switch S1 to the throw terminal T2 of the switch S2. The switch S2 is configured to selectively open and close a path between the throw terminal T1 and the throw terminal T2. When the path between the pole terminal P of the switch S1 and the throw terminal T2 of the switch S1 is closed and when the path between the throw terminal T1 of the switch S2 and the throw terminal T2 of the switch S2 is closed, a signal (e.g., signals 118, 122) propagates between the antenna A2 and the on-board range measurement device 406(1). In this case, the TOT measured by the on-board range measurement device 406(1) includes the internal delay T1R1A2 described above with respect to FIG. 1B. This is shown in FIG. 4B. In this case, the internal delay T1R1A2 includes the delay through the coaxial cable C1P, the switch S1 from the pole terminal P to the throw terminal T2, the coaxial cable CTT, the switch S2 from the throw terminal T2 to the throw terminal T1, and the coaxial cable C2T.

The coaxial cable C2P, the switch S2, the coaxial cable CTT, the switch S1, and the coaxial cable C1T connect the on-board range measurement device 406(2) to the antenna A1. The switch S1 is configured to selectively open and close a path between the throw terminal T1 and the throw terminal T2. When the path between the pole terminal P of the switch S2 and the throw terminal T2 of the switch S2 is closed and when the path between the throw terminal T1 of the switch S1 and the throw terminal T2 of the switch S1 is closed, a signal (e.g., signals 116, 120) propagates between the antenna A1 and the on-board range measurement device 406(2). In this case, the TOT measured by the on-board range measurement device 406(2) includes an internal delay (equivalent to T1R1A1 described above with respect to FIG. 1B) that includes the delay through the coaxial cable C2P, the switch S2 from the pole terminal P to the throw terminal T2, the coaxial cable CTT, the switch S1 from the throw terminal T2 to the throw terminal T1, and the coaxial cable C1T. This configuration is shown in FIG. 4E.

Figure 4C:
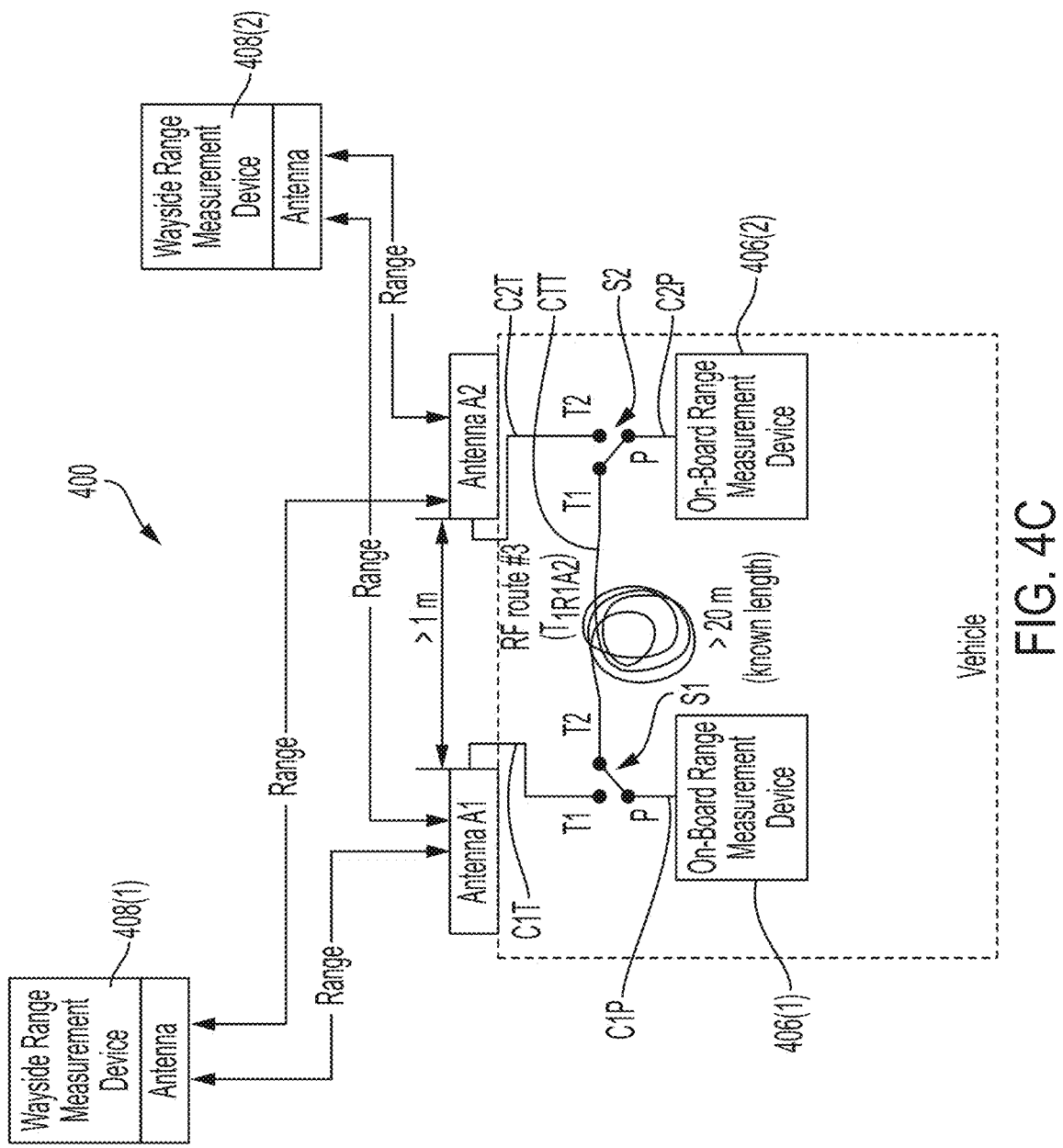
Figure 4D:
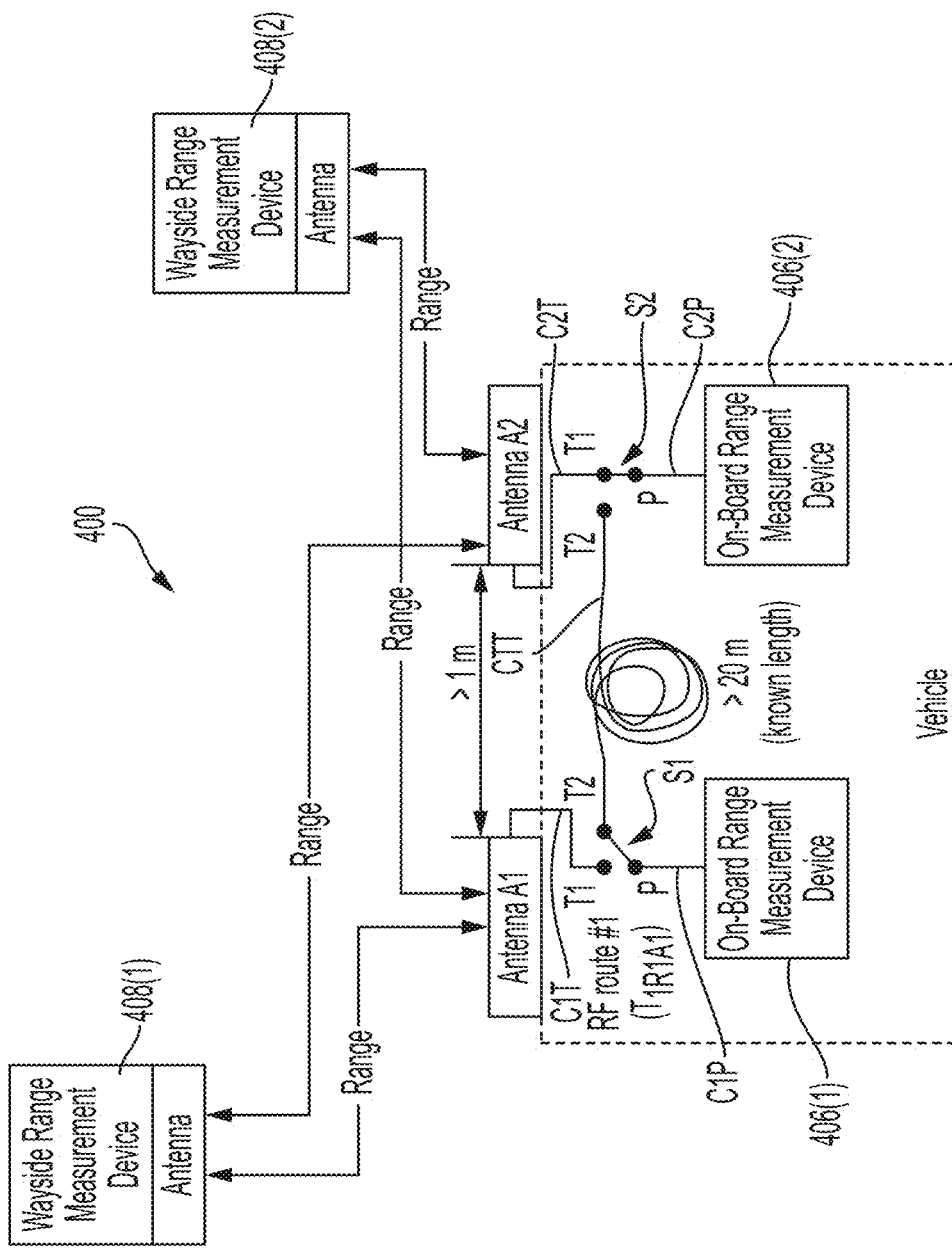
Figure 4E:
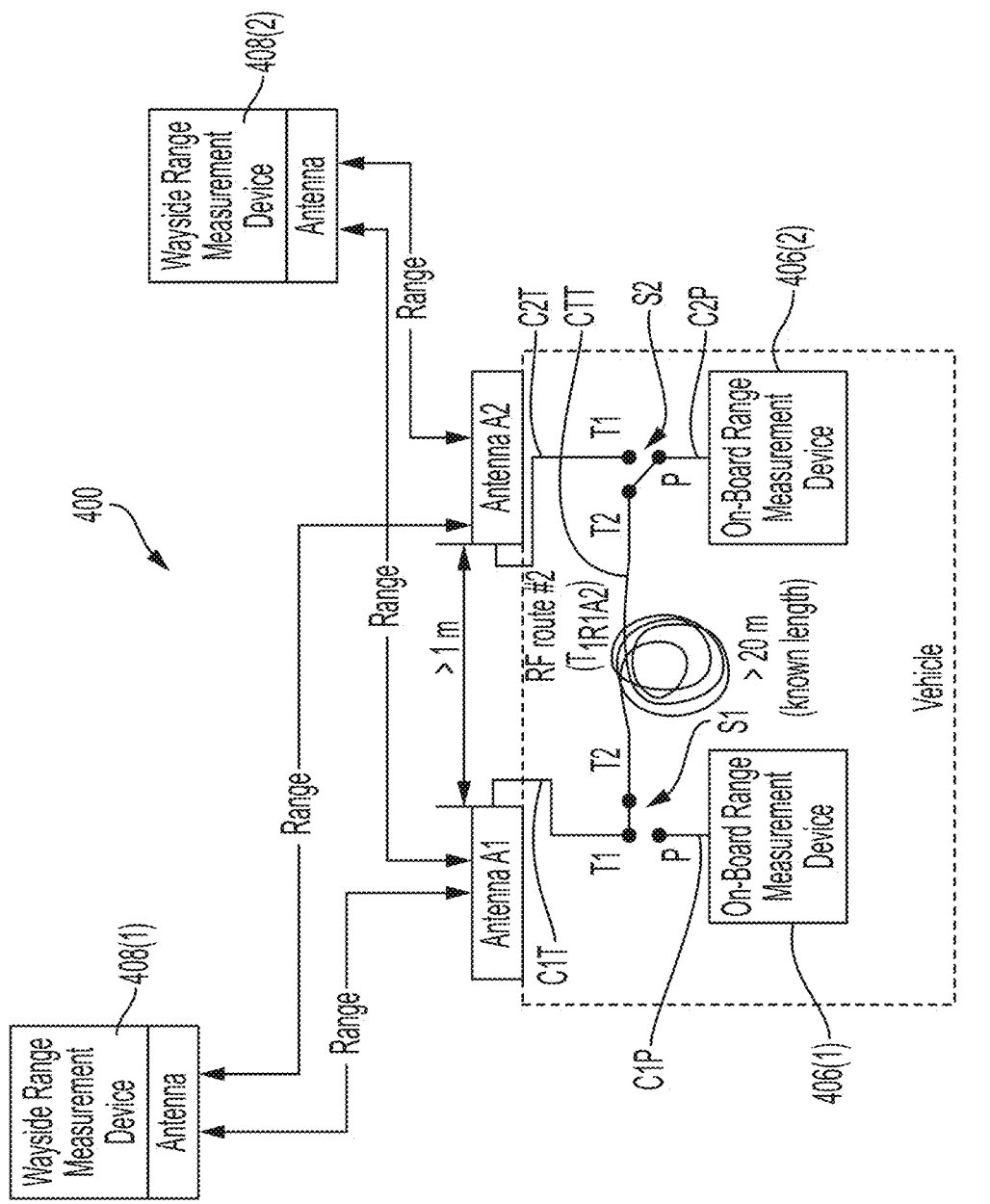

In FIG. 4C, the path from the pole terminal P of the switch S1 to the throw terminal T2 of the switch S1 is closed and the path from the pole terminal P of the switch S2 to the throw terminal T2 of the switch S2 is closed. In FIG. 4C, a signal propagates from the MCU/CPU of the on-board range measurement device 406(1) to the MCU/CPU of the on-board range measurement device 406(2) through the coaxial cable CTT. Thus, in this case, the TOT of the signal is used to measure the delay though the coaxial cable CTT, which is equivalent to the delay TR1R2 discussed above.

FIGS. 5A-5E are a top view of on-board components 500 in a range measurement system, in accordance with some embodiments.

In FIGS. 5A-5E, the on-board components 500 include an on-board range measurement device 506(1) and an on-board range measurement device 506(2). On-board range measurement device 506(1) and on-board range measurement device 506(2) correspond with on-board range measurement device 406(1) and on-board range measurement device 406(2), in FIGS. 4A-4E. On-board components 500 also include antennas A1, A2, the switches SW1, SW2, and coaxial cables CT1, CT2, CTT, C1P, and C2P. However, in this embodiment, the switch SW1 also includes a terminal IN and a terminal OUT. The terminal IN is an input terminal to a delay line D1 and the terminal OUT is an output terminal to the delay line D1. In this embodiment, the switch S2 also includes a terminal IN and a terminal OUT. The terminal IN is an input terminal to a delay line D2 and the terminal OUT is an output terminal to the delay line D2. Delay lines D1, D2 are configured to introduce a variable delay. Accordingly, the variable delay of the delay lines D1, D2 are configured to be varied by on the on-board range measurement devices 506(1), 506(2) in order to determine if the on-board components 500 are to be calibrated. The delay lines D1, D2 are devices that are configurable to introduce a variable delay in a coaxial cable. In some embodiments, the delay lines D1, D2 each include a Field Programmable Gate Array (FPGA) configured to introduce the variable delay.

Figure 5A:
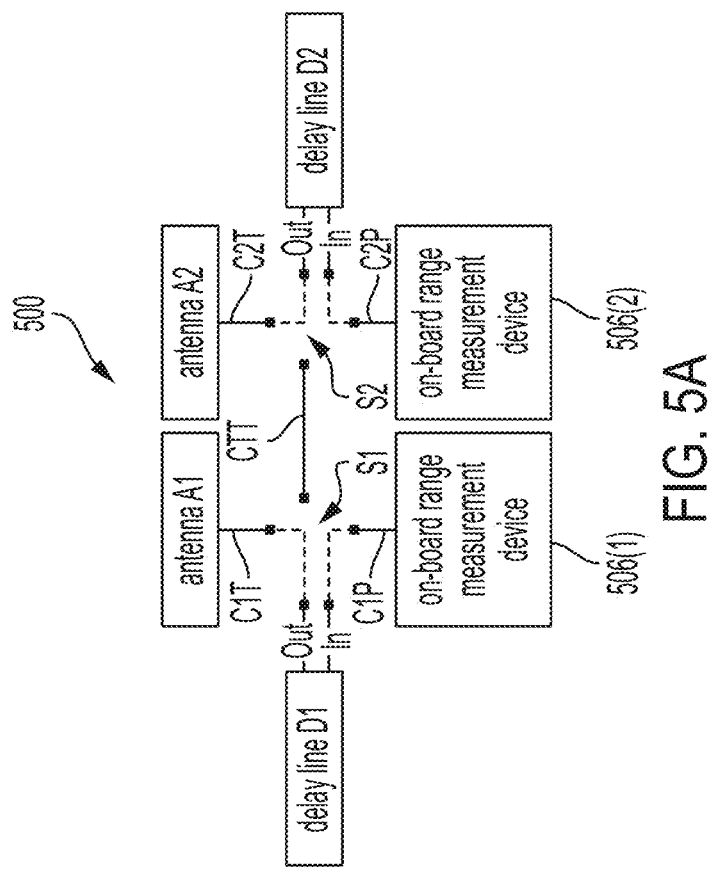
FIGS. 5A-5E are a top view of on-board components in a range measurement system, in accordance with some embodiments.

In FIG. 5A, a path between the pole terminal P of switch S1 and the terminal IN of the delay line D1 is closed and a path between the terminal OUT of the delay line D1 and the throw terminal T1 of the switch SW1 is closed. Accordingly, the delay line D1 is configured to introduce a variable delay between the on-board range measurement device 506(1) and the antenna A1. Signals 116, 120 propagate between the on-board range measurement device 506(1) and the antenna A1 but are delayed by the variable delay by the delay line D1. Furthermore, signals 118, 122 propagate between the on-board range measurement device 506(2) and the antenna A2 but are delayed by the variable delay by the delay line D2.

Furthermore, a path between the pole terminal P of switch SW2 and the terminal IN of the delay line D2 is closed and a path between the terminal OUT of the delay line D2 and the throw terminal T1 of switch S2 is closed. Accordingly, the delay line D2 is configured to introduce a variable delay between the on-board range measurement device 506(2) and the antenna A2.

Figure 5B:
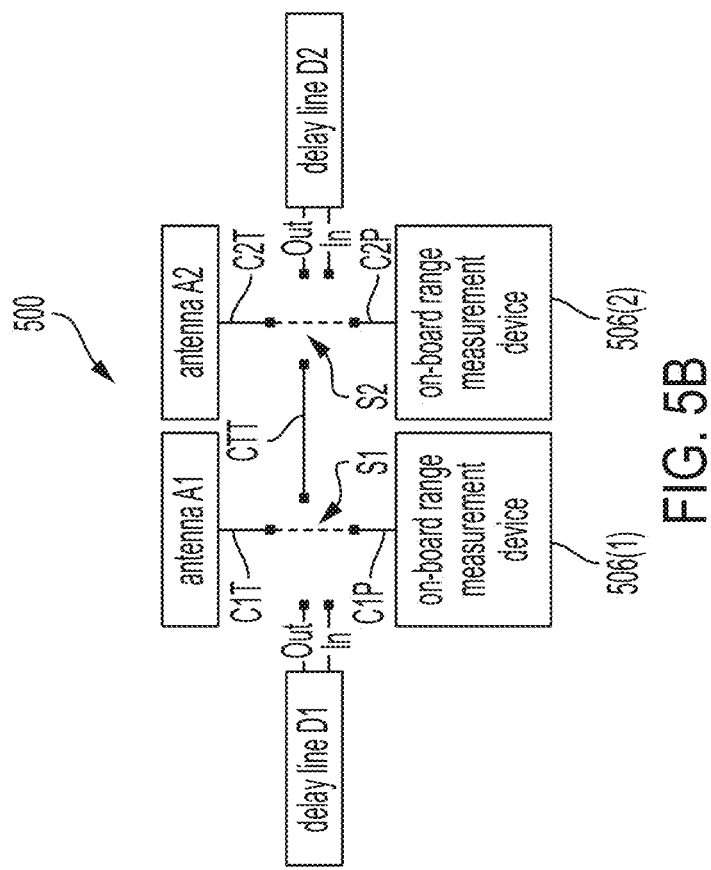

In FIG. 5B, a path between the pole terminal P of switch S1 and the throw terminal T1 of the switch S1 is closed and a path between the pole terminal P of the switch S2 and the throw terminal T1 of the switch S2 is closed. Accordingly, the delay line D1 is bypassed and the delay line D2 is bypassed. Signals 116, 120 propagate between the on-board range measurement device 506(1) and the antenna A1 and are not delayed by the variable delay of the delay line D1. Furthermore, signals 118, 122 propagate between the on-board range measurement device 506(2) and the antenna A2 but are not delayed by the variable delay of the delay line D2.

Figure 5C:
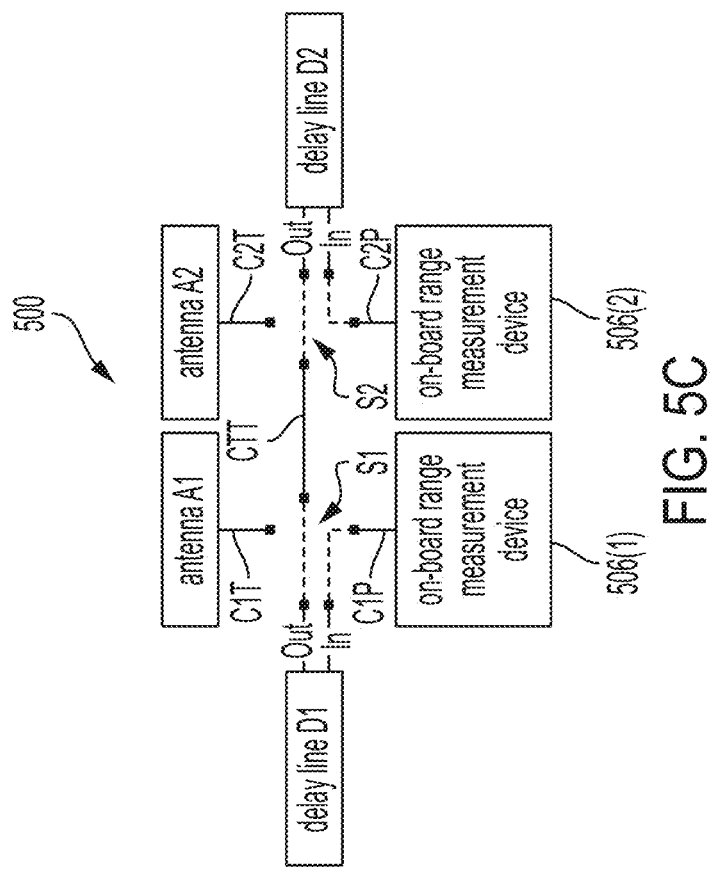

In FIG. 5C, a path between the pole terminal P of the switch S1 and the terminal IN is closed, a path between the terminal OUT of the switch S1 and the throw terminal T2 of the switch S1 is closed, a path between the terminal OUT of the switch S2 and the throw terminal T2 of the switch S2, and a path between the pole terminal P of the switch S2 and the terminal IN of the switch S2 is closed. Accordingly, the signals 212(1), 212(2) (See FIG. 2) propagate between the MCU/CPU of the on-board range measurement device 506(1) to the MCU/CPU of the on-board range measurement device 506(2), as explained above with respect to FIG. 2. However, each of the signals 212(1), 212(2) are delayed by both the variable delay of the delay line D1 and the variable delay of the delay line D2.

Figure 5D:
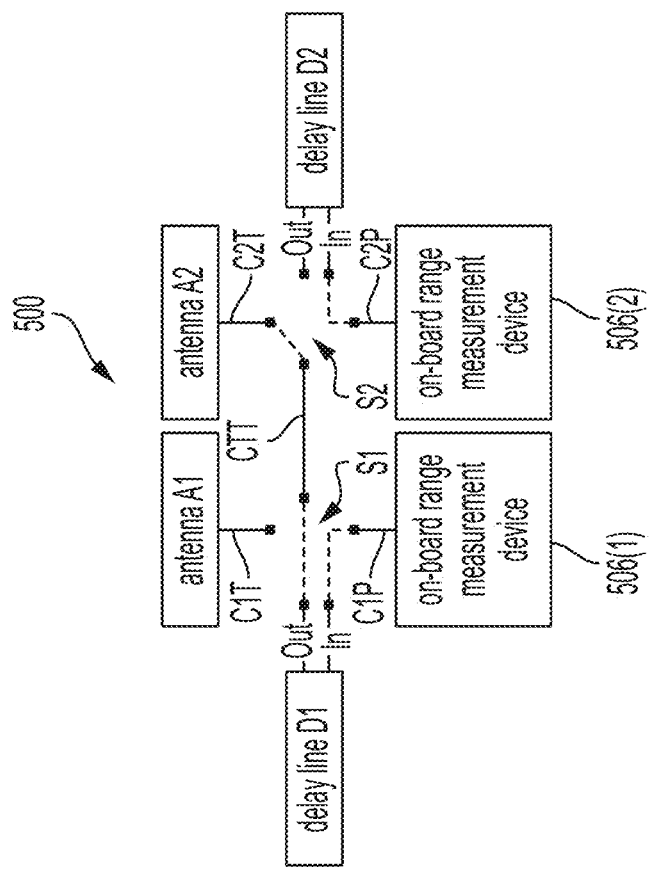

In FIG. 5D, a path between the pole terminal P of the switch S1 and the terminal IN is closed, a path between the terminal OUT of the switch S1 and the throw terminal T2 of the switch S1 is closed, and a path between the throw terminal T1 of the switch S2 and the throw terminal of the switch S2 is closed. In this manner, signals 118, 122 (See FIG. 1B) propagate between the on-board range measurement device 506(1) and the antenna A2. In FIG. 5D, the variable delay of the delay line D1 introduces a delay to the signals 118, 122. When a path between the pole terminal P of the switch S2 and the terminal IN is closed, a path between the terminal OUT of the switch S2 and the throw terminal T2 of the switch S2 is closed, and a path between the throw terminal T1 of the switch S1 and the throw terminal of the switch S1 is closed (not shown), then the signals 116, 120 propagate between the antenna A1 and the on-board range measurement device 506(2) where the delay line D2 introduces a variable delay. This configuration is not shown but is analogous to the configuration shown in FIG. 5D but with respect to the antenna A1 and the on-board range measurement device 506(2) instead of the antenna A2 and the on-board range measurement device 506(1) as shown in FIG. 5D.

Figure 5E:
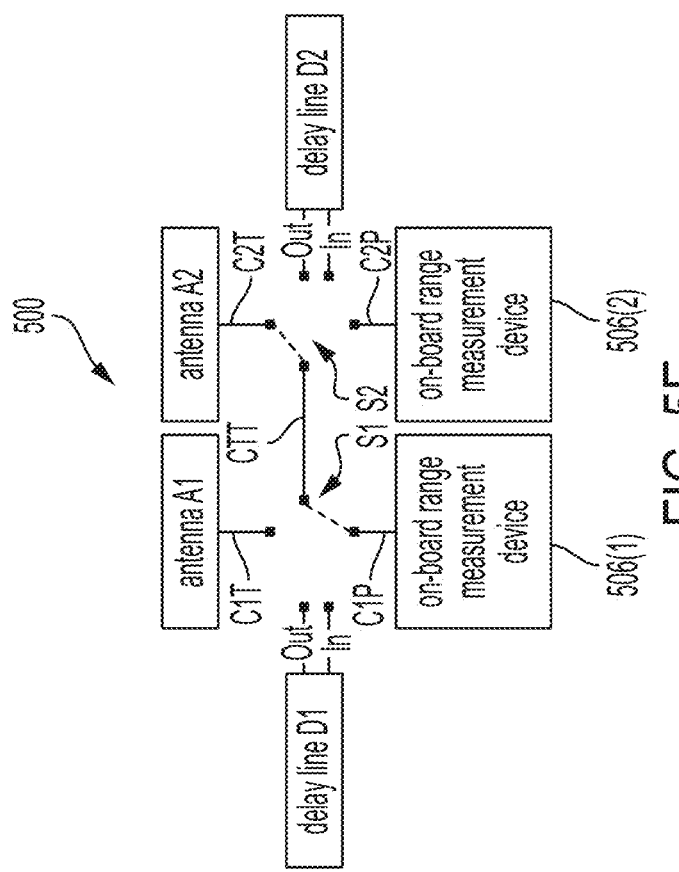

In FIG. 5E, a path between the pole terminal P of the switch S1 and the throw terminal T2 of the switch S1 is closed, and a path between the throw terminal T2 and the throw terminal T1 of the switch S2 is closed. In this manner, signals 118, 122 (See FIG. 1B) propagate between the on-board range measurement device 506(1) and the antenna A2. In FIG. 5E, delay line D1 is bypassed. When a path between the pole terminal P of the switch S1 and the throw terminal T2 is closed, and a path between the throw terminal T2 and the throw terminal T1 of the switch S1 is closed (not shown), then the signals 116, 120 propagate between the antenna A1 and the on-board range measurement device 506(2) where the delay line D2 is bypassed.

FIGS. 6A-6E are a top view of wayside components 600 in a range measurement system, in accordance with some embodiments.

In FIGS. 6A-6E, the wayside components 600 include wayside range measurement device 608(1) and a wayside range measurement device 608(2). Wayside range measurement device 608(1) and wayside range measurement device 608(2) correspond with wayside range measurement device 108(1) and wayside range measurement device 108(2), in FIG. 5C. The wayside components 600 have the same structure as the on-board components 500, except that the wayside range measurement devices 608(1), 608(2) are used instead of on-board range measurement devices 506(1), 506(2). Wayside components 600 thus also include antennas A1, A2, the switches SW1, SW2 (each having the additional IN terminal and OUT terminal), and coaxial cables CT1, CT2, CTT, C1P, C2P. However, the pole terminal P of switch S1 is connected to the wayside range measurement device 608(1) (instead of on-board range measurement device 506(1)) and the pole terminal P of switch S2 is connected to the wayside range measurement device 608(2) (instead of on-board range measurement device 508(2)). Delay lines D1, D2 are configured to introduce a variable delay. Accordingly, the variable delay of the delay lines D1, D2 are configured to be varied by the wayside range measurement devices 608(1), 608(2) in order to calibrate the wayside components 600. The delay lines D1, D2 are devices that are configurable to introduce a variable delay in a coaxial cable. In some embodiments, the delay lines D1, D2 each include an FPGA configured to introduce the variable delay.

Figure 6A:
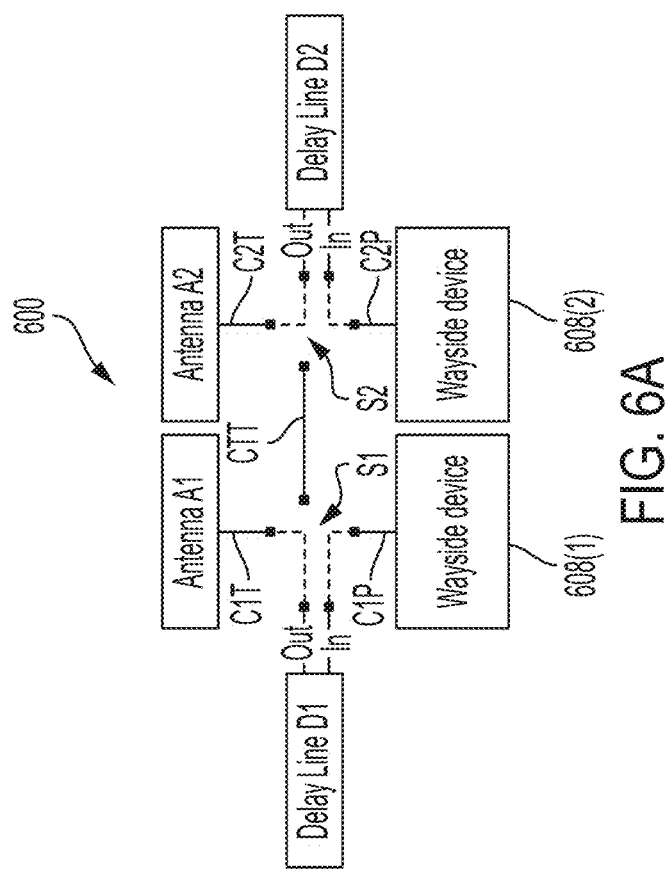

In FIG. 6A, a path between the pole terminal P of switch S1 and the terminal IN of the delay line D1 is closed and a path between the terminal OUT of the delay line D1 and the throw terminal T1 of the switch SW1 is closed. Accordingly, the delay line D1 is configured to introduce a variable delay between the wayside range measurement device 608(1) and the antenna A1. Signals 116, 120 propagate between the wayside range measurement device 608(1) and the antenna A1 but are delayed by the variable delay by the delay line D1. Furthermore, signals 118, 122 propagate between the wayside range measurement device 608(2) and the antenna A2 but are delayed by the variable delay by the delay line D2.

Furthermore, a path between the pole terminal P of switch SW2 and the terminal IN of the delay line D2 is closed and a path between the terminal OUT of the delay line D2 and the throw terminal T1 of switch S2 is closed. Accordingly, the delay line D2 is configured to introduce a variable delay between the wayside range measurement device 608(2) and the antenna A2.

Figure 6B:
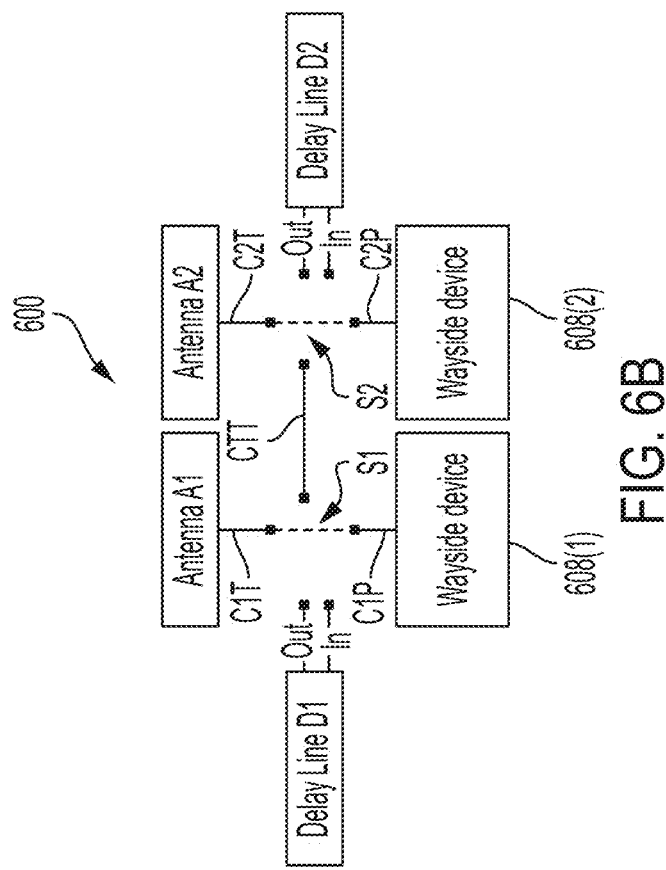

In FIG. 6B, a path between the pole terminal P of switch S1 and the throw terminal T1 of the switch S1 is closed and a path between the pole terminal P of the switch S2 and the throw terminal T1 of the switch S2 is closed. Accordingly, the delay line D1 is bypassed and the delay line D2 is bypassed. Signals 116, 120 propagate between the wayside range measurement device 608(1) and the antenna A1 and are not delayed by the variable delay of the delay line D1. Furthermore, signals 118, 122 propagate between the wayside range measurement device 608(2) and the antenna A2 but are not delayed by the variable delay of the delay line D2.

Figure 6C:
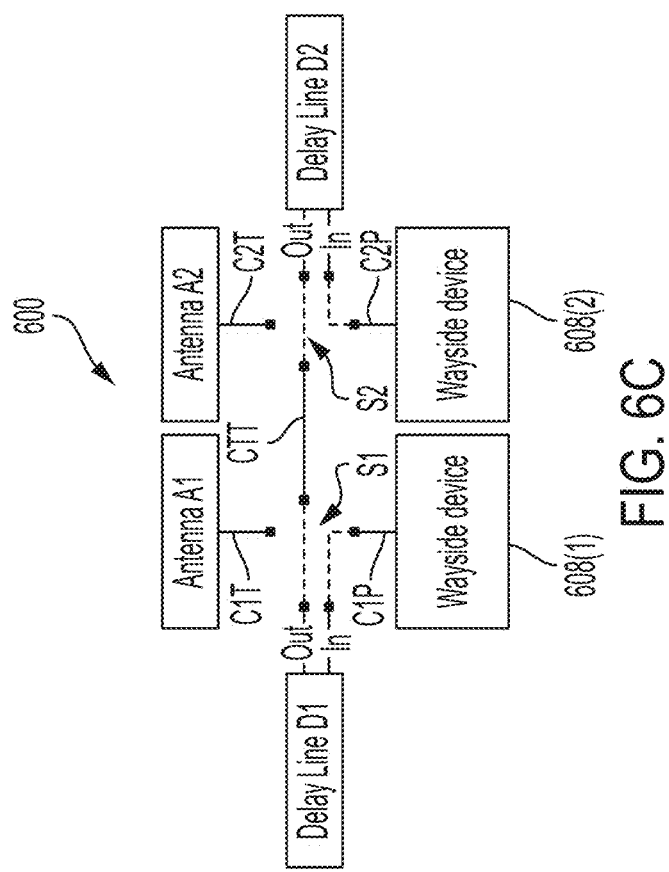

In FIG. 6C, a path between the pole terminal P of the switch S1 and the terminal IN is closed, a path between the terminal OUT of the switch S1 and the throw terminal T2 of the switch S1 is closed, a path between the terminal OUT of the switch S2 and the throw terminal T2 of the switch S2, and a path between the pole terminal P of the switch S2 and the terminal IN of the switch S2 is closed. Accordingly, the signals 212(1), 212(2) (See FIG. 2) propagate between the MCU/CPU of the wayside range measurement device 608 (1) to the MCU/CPU of the wayside range measurement device 608(2), as explained above with respect to FIG. 2. However, each of the signals 212(1), 212(2) are delayed by both the variable delay of the delay line D1 and the variable delay of the delay line D2.

Figure 6D:
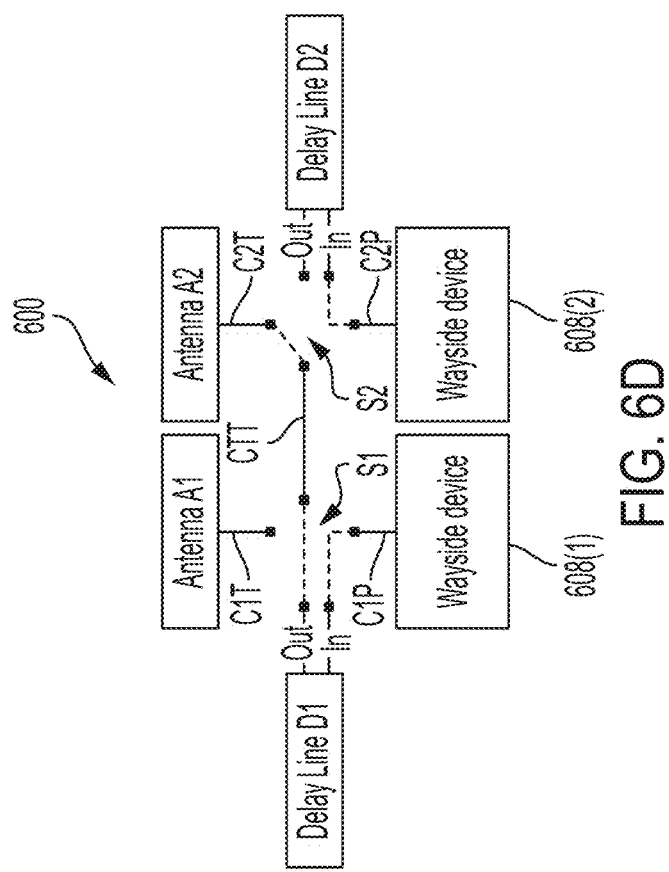

In FIG. 6D, a path between the pole terminal P of the switch S1 and the terminal IN is closed, a path between the terminal OUT of the switch S1 and the throw terminal T2 of the switch S1 is closed, and a path between the throw terminal T1 of the switch S2 and the throw terminal of the switch S2 is closed. In this manner, signals 118, 122 (See FIG. 1B) propagate between the wayside range measurement device 608(1) and the antenna A2. In FIG. 6D, the variable delay of the delay line D1 introduces a delay to the signals 118, 122. When a path between the pole terminal P of the switch S2 and the terminal IN is closed, a path between the terminal OUT of the switch S2 and the throw terminal T2 of the switch S2 is closed, and a path between the throw terminal T1 of the switch S1 and the throw terminal of the switch S1 is closed (not shown), then the signals 116, 120 propagate between the antenna A1 and the wayside range measurement device 608(2) where the delay line D2 introduces a variable delay. This configuration is not shown but is analogous to the configuration shown in FIG. 6D but with respect to the antenna A1 and the wayside range measurement device 608(2) instead of the antenna A2 and the wayside range measurement device 608(1) as shown in FIG. 6D.

Figure 6E:
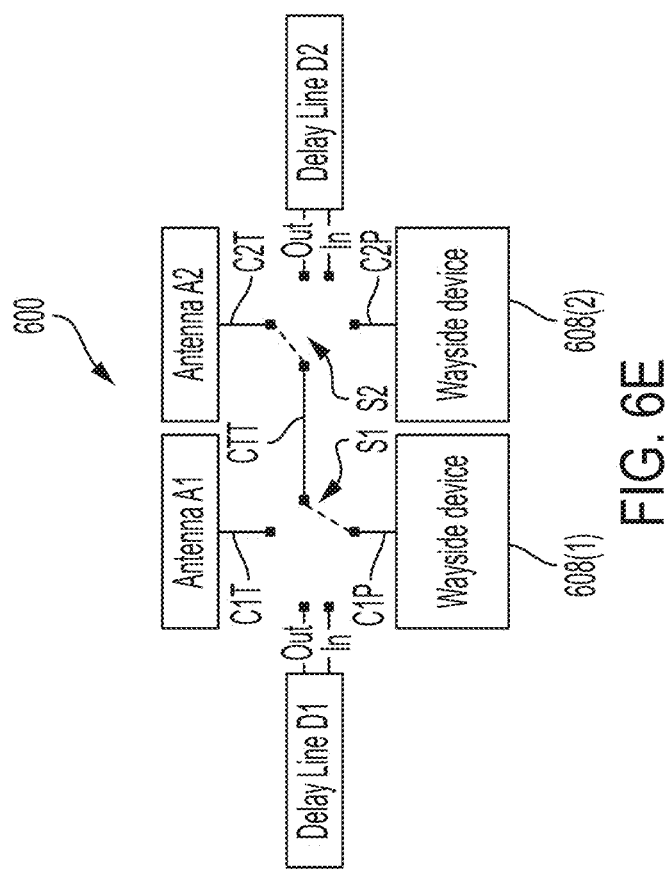

In FIG. 6E, a path between the pole terminal P of the switch S1 and the throw terminal T2 of the switch S1 is closed, and a path between the throw terminal T2 and the throw terminal T1 of the switch S2 is closed. In this manner, signals 118, 122 (See FIG. 1B) propagate between the wayside range measurement device 608(1) and the antenna A2. In FIG. 6E, delay line D1 is bypassed. When a path between the pole terminal P of the switch S1 and the throw terminal T2 is closed, and a path between the throw terminal T2 and the throw terminal T1 of the switch S1 is closed (not shown), then the signals 116, 120 propagate between the antenna A1 and the wayside range measurement device 608(2) where the delay line D2 is bypassed.

FIG. 6F a range measurement system 650 for a vehicle 652 mounted on a guideway 654 is calibrated, in accordance with some embodiments.

In this embodiment, the range measurement system 650 includes a wayside range measurement device 656, a wayside range measurement device 658, and a wayside range measurement device 660. The wayside range measurement device 656 is a distance of R12 from the wayside range measurement device 658. The wayside range measurement device 656 is a distance of R13 from the wayside range measurement device 660. The wayside range measurement device 658 is a distance of R23 from the wayside range measurement device 660.

A pre-determined time for a signal to travel from an internal component (e.g., MCU/CPU) of the wayside range measurement device 656, to an antenna of the wayside range measurement device 656, to an antenna of the wayside range measurement device 658, and to an internal component (e.g., MCU/CPU) of the wayside range measurement device 658 is measured and stored. Additionally, a pre-determined time for a signal to travel from an internal component (e.g., MCU/CPU) of the wayside range measurement device 656, to an antenna of the wayside range measurement device 656, to an antenna of the wayside range measurement device 660, and to an internal component (e.g., MCU/CPU) of the wayside range measurement device 660 is measured and stored. Finally, a pre-determined time for a signal to travel from an internal component (e.g., MCU/CPU) of the wayside range measurement device 658, to an antenna of the wayside range measurement device 658, to an antenna of the wayside range measurement device 660, and to an internal component (e.g., MCU/CPU) of the wayside range measurement device 660 is measured and stored.

During calibration, a first TOT is measured between the internal component of the wayside range measurement device 656 and the internal component of the wayside range measurement device 658. Additionally, a second TOT is measured between the internal component of the wayside range measurement device 656 and the internal component of the wayside range measurement device 660. Finally, a third TOT is measured between the internal component of the wayside range measurement device 658 and the internal component of the wayside range measurement device 660.

The first TOT is compared with the first pre-determined time, the second TOT is compared with the second pre-determined time, and the third TOT is compared with the third pre-determined time. The health of the range measurement system 650 is determined based on a difference between the first TOT and the first pre-determined time, a difference between the second TOT and the second pre-determined time, and a difference between the third TOT and the third pre-determined time. When the differences are small, the range measurement system 650 is calibrated. However, when the differences are large, the range measurement system 650 is not calibrated and calibration procedures are performed by analyzing the differences to determine where calibration is to be performed.

In FIG. 6F, there are three wayside range measurement devices 656, 658, 660. In other embodiments, there are less than three or more than three wayside range measurement devices. As such, less than three or more than three pre-determined times are stored in other embodiments and less than three or more than three TOTs are measured during calibration.

The wayside range measurement devices 656, 658, 660 are static and their location on the map is known. Accordingly, the range between any pair of wayside range measurement devices 656, 658, 660 is known with high degree of accuracy and doesn't change. A range between any the pair of wayside range measurement devices 656, 658, 660 is measured and compared with the known range. If the range measurement for any pair of the wayside range measurement device 656, 658, 660 is within the error tolerance then the wayside range measurement devices 656, 658, 660 are healthy. However, if the range measurement between first pair of the wayside range measurement devices 656, 658, 660 is unhealthy, then the range measurement for a different and second pair of the wayside range measurement devices 656, 658, 660 is determined. If the range measurement of the second pair is healthy but the range measurement of the first pair is unhealthy, then the wayside range measurement device 656, 658, 660 in the first pair but not in the second pair is the wayside range measurement device 656, 658, 660 that is uncalibrated.

Figure 6G:
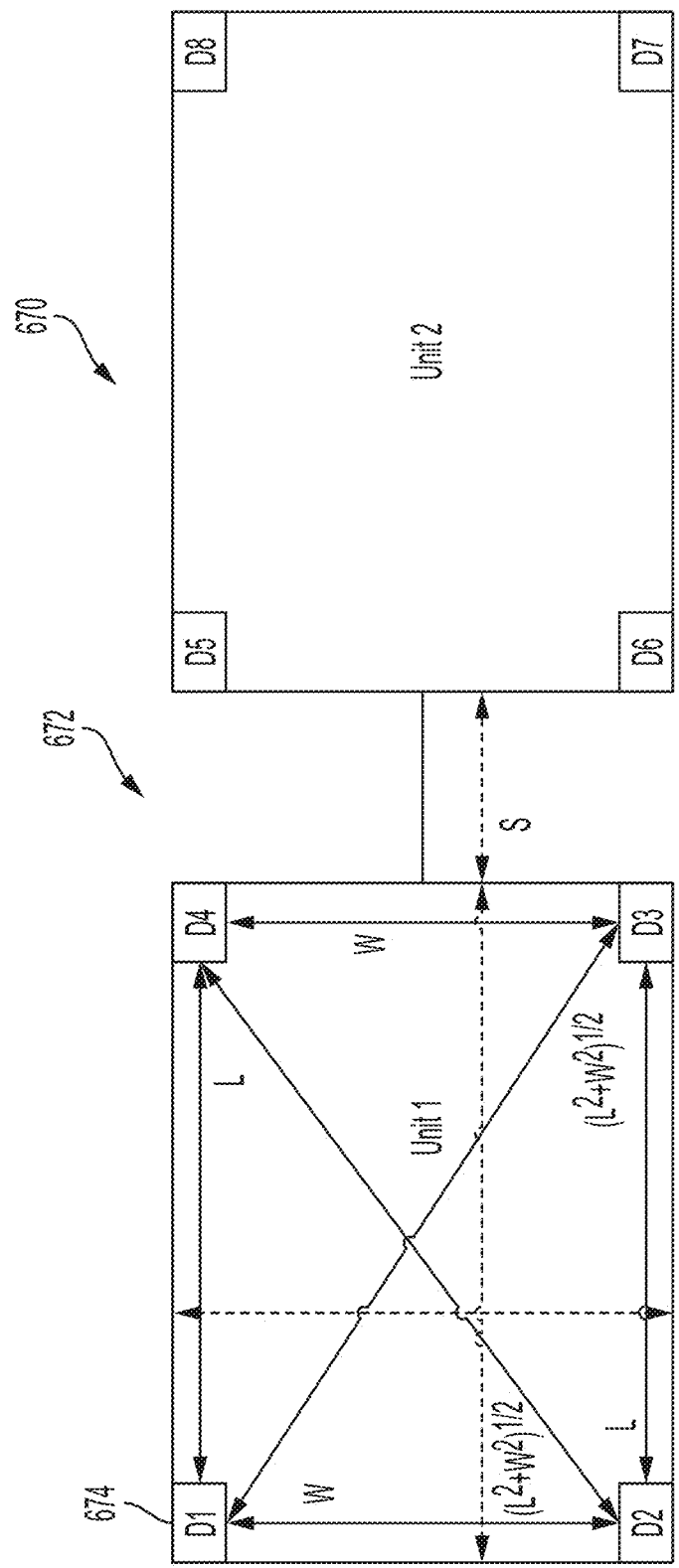

FIG. 6G is a range measurement system 670 for a vehicle 672 mounted on a guideway 654 is calibrated, in accordance with some embodiments.

In this embodiment, the vehicle 672 includes two units, unit 1 and unit 2. In the top left corner of unit 1, the vehicle 672 includes an on-board range measurement device D1. In the bottom left corner of unit 1, the vehicle 672 includes an on-board range measurement device D2. In the bottom right corner of unit 1, the vehicle 672 includes an on-board range measurement device D3. In the top right corner of unit 1, the vehicle 672 includes an on-board range measurement device D4. The length of unit 1 is L and the width of unit 1 is w. Thus, the range between D1 and D4 is L and the range between D2 and D3 is L. The range between D1 and D2 is w and the range between D3 and D4 is w. The range between D1 and D3 is the square root of L squared plus W squared. The range between D2 and D4 is the square root of L squared plus W squared.

A pre-determined time for a signal to travel from an internal component (e.g., MCU/CPU) of the on-board range measurement device D1, to an antenna of the on-board range measurement device D1, to an antenna of the on-board range measurement device D2, and to an internal component (e.g., MCU/CPU) of the on-board range measurement device D2 is measured and stored. A pre-determined time for a signal to travel from an internal component (e.g., MCU/CPU) of the on-board range measurement device D1, to an antenna of the on-board range measurement device D1, to an antenna of the on-board range measurement device D3, and to an internal component (e.g., MCU/CPU) of the on-board range measurement device D3 is measured and stored. A pre-determined time for a signal to travel from an internal component (e.g., MCU/CPU) of the on-board range measurement device D1, to an antenna of the on-board range measurement device D1, to an antenna of the on-board range measurement device D4, and to an internal component (e.g., MCU/CPU) of the on-board range measurement device D4 is measured and stored. A pre-determined time for a signal to travel from an internal component (e.g., MCU/CPU) of the on-board range measurement device D2, to an antenna of the on-board range measurement device D2, to an antenna of the on-board range measurement device D3, and to an internal component (e.g., MCU/CPU) of the on-board range measurement device D3 is measured and stored. A pre-determined time for a signal to travel from an internal component (e.g., MCU/CPU) of the on-board range measurement device D2, to an antenna of the on-board range measurement device D2, to an antenna of the on-board range measurement device D4, and to an internal component (e.g., MCU/CPU) of the on-board range measurement device D4 is measured and stored. A pre-determined time for a signal to travel from an internal component (e.g., MCU/CPU) of the on-board range measurement device D3, to an antenna of the on-board range measurement device D3, to an antenna of the on-board range measurement device D4, and to an internal component (e.g., MCU/CPU) of the on-board range measurement device D4 is measured and stored.

During calibration, a first TOT for a signal to travel from an internal component (e.g., MCU/CPU) of the on-board range measurement device D1, to an antenna of the on-board range measurement device D1, to an antenna of the on-board range measurement device D2, and to an internal component (e.g., MCU/CPU) of the on-board range measurement device D2 is measured. A second TOT for a signal to travel from an internal component (e.g., MCU/CPU) of the on-board range measurement device D1, to an antenna of the on-board range measurement device D1, to an antenna of the on-board range measurement device D3, and to an internal component (e.g., MCU/CPU) of the on-board range measurement device D3 is measured. A third TOT for a signal to travel from an internal component (e.g., MCU/CPU) of the on-board range measurement device D1, to an antenna of the on-board range measurement device D1, to an antenna of the on-board range measurement device D4, and to an internal component (e.g., MCU/CPU) of the on-board range measurement device D4 is measured and stored.

A pre-determined time for a signal to travel from an internal component (e.g., MCU/CPU) of the on-board range measurement device D2, to an antenna of the on-board range measurement device D2, to an antenna of the on-board range measurement device D3, and to an internal component (e.g., MCU/CPU) of the on-board range measurement device D3 is measured and stored. A pre-determined time for a signal to travel from an internal component (e.g., MCU/CPU) of the on-board range measurement device D2, to an antenna of the on-board range measurement device D2, to an antenna of the on-board range measurement device D4, and to an internal component (e.g., MCU/CPU) of the on-board range measurement device D4 is measured and stored. A pre-determined time for a signal to travel from an internal component (e.g., MCU/CPU) of the on-board range measurement device D3, to an antenna of the on-board range measurement device D3, to an antenna of the on-board range measurement device D4, and to an internal component (e.g., MCU/CPU) of the on-board range measurement device D4 is measured and stored.

The first pre-determined time is compared with the first TOT, the second pre-determined time is compared with the second TOT, and the third pre-determined time is compared with the third TOT. If all three comparisons are within an acceptable error range then the on board range measurement devices D1-D4 are calibrated. If any one of the comparisons is within an acceptable error range, then the on-board range measurement device D1 and the other on-board range measurement device that had the acceptable error range are healthy. TOTs for the other on-board range measurement device should be compared to predetermined times to determine which of these other on board range measurement devices is unhealthy and are to be recalibrated.

For example, suppose that all three comparisons of TOTs and predetermined times were outside the error range. In this case, it is unclear whether all of the on-board range measurement devices D1-D4 are unhealthy, on-board range measurement device D1 is unhealthy while on-board range measurement devices D2-D4 are healthy, on-board range measurement device D1 is unhealthy and some but not all of on-board range measurement devices D2-D4 are unhealthy or on-board range measurement device D1 is healthy and some but on-board range measurement devices D2-D4 are unhealthy.

In this case, a fourth TOT is measured between on-board range measurement device D2 and on-board range measurement device D3 and compared to a corresponding predetermined time. A fifth TOT is measured between on-board range measurement device D2 and on-board range measurement device D4 and compared to a corresponding predetermined time. A sixth TOT is measured between on-board range measurement device D3 and on-board range measurement device D4 and compared to a corresponding predetermined time. By determining which combinations of TOTs and pre-determined times are within the acceptable error ranges and which combinations are outside the acceptable error ranges, a user logically deduced which of the on-board range measurement devices D1-D4 are calibrated and which of the on-board range measurement devices D1-D4 are uncalibrated.

Similar procedures are implemented with respect to on-board range measurement devices D5-D7 in unit 2.

Figure 6H:
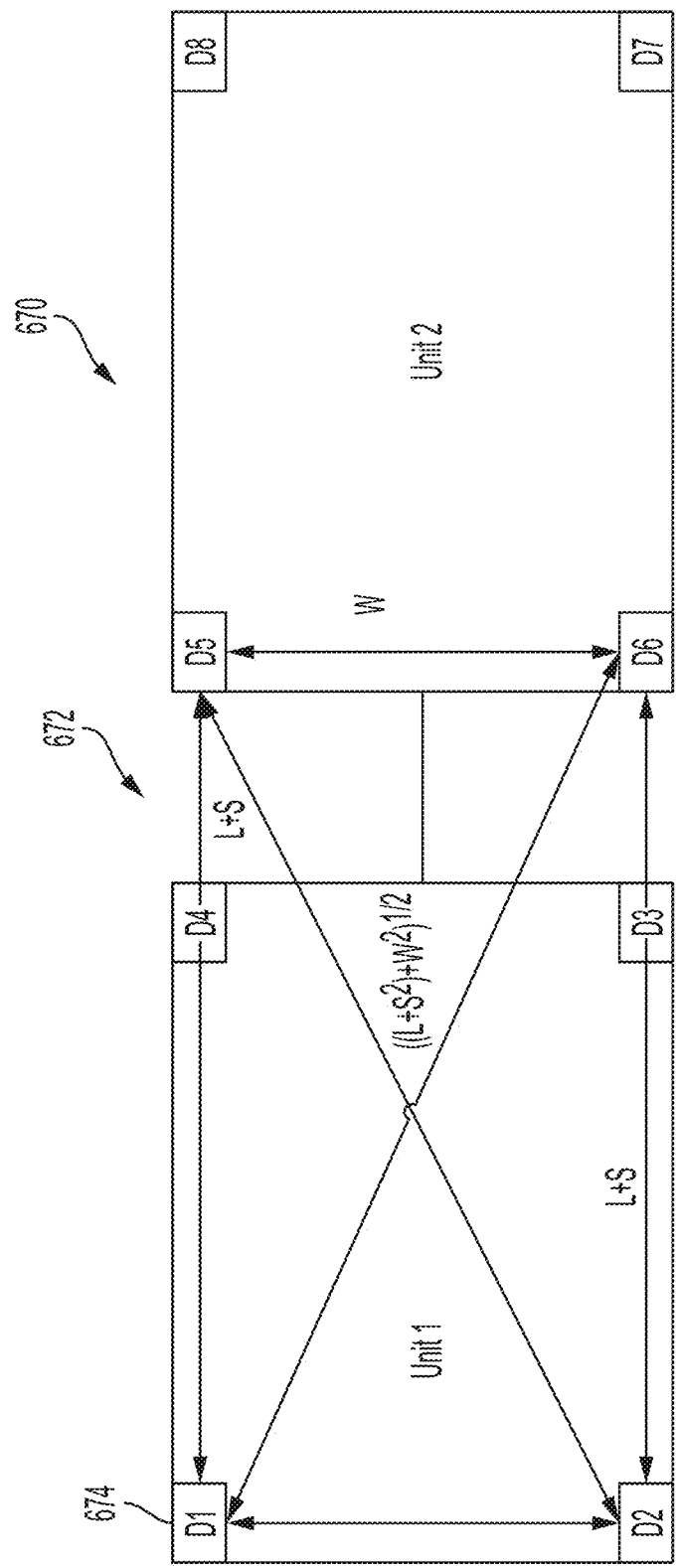

FIG. 6H is the range measurement system 670 for the vehicle 672 mounted on the guideway 654 is calibrated, in accordance with some embodiments.

In this embodiment, the vehicle 672 includes two units, unit 1 and unit 2. In the top left corner of unit 2, the vehicle 672 includes an on-board range measurement device D5. In the bottom left corner of unit 2, the vehicle 672 includes an on-board range measurement device D6. In the bottom right corner of unit 2, the vehicle 672 includes an on-board range measurement device D7. In the top right corner of unit 2, the vehicle 672 includes an on-board range measurement device D8. The length of unit 2 is L and the width of unit 2 is w. The distance between unit 1 and unit 2 is S. Thus, the range between D1 and D5 is L+S and the range between D2 and D6 is L+S. The range between D1 and D2 is w and the range between D6 and D5 is w. The range between D1 and D6 is the square root of L+S squared plus W squared. The range between D2 and D5 is the square root of L+S squared plus W squared.

A pre-determined time for a signal to travel from an internal component (e.g., MCU/CPU) of the on-board range measurement device D1, to an antenna of the on-board range measurement device D1, to an antenna of the on-board range measurement device D2, and to an internal component (e.g., MCU/CPU) of the on-board range measurement device D2 is measured and stored. A pre-determined time for a signal to travel from an internal component (e.g., MCU/CPU) of the on-board range measurement device D1, to an antenna of the on-board range measurement device D1, to an antenna of the on-board range measurement device D6, and to an internal component (e.g., MCU/CPU) of the on-board range measurement device D6 is measured and stored. A pre-determined time for a signal to travel from an internal component (e.g., MCU/CPU) of the on-board range measurement device D1, to an antenna of the on-board range measurement device D1, to an antenna of the on-board range measurement device D5, and to an internal component (e.g., MCU/CPU) of the on-board range measurement device D5 is measured and stored. A pre-determined time for a signal to travel from an internal component (e.g., MCU/CPU) of the on-board range measurement device D2, to an antenna of the on-board range measurement device D2, to an antenna of the on-board range measurement device D6, and to an internal component (e.g., MCU/CPU) of the on-board range measurement device D6 is measured and stored. A pre-determined time for a signal to travel from an internal component (e.g., MCU/CPU) of the on-board range measurement device D2, to an antenna of the on-board range measurement device D2, to an antenna of the on-board range measurement device D5, and to an internal component (e.g., MCU/CPU) of the on-board range measurement device D5 is measured and stored. A pre-determined time for a signal to travel from an internal component (e.g., MCU/CPU) of the on-board range measurement device D6, to an antenna of the on-board range measurement device D6, to an antenna of the on-board range measurement device D5, and to an internal component (e.g., MCU/CPU) of the on-board range measurement device D5 is measured and stored.

During calibration, a first TOT for a signal to travel from an internal component (e.g., MCU/CPU) of the on-board range measurement device D1, to an antenna of the on-board range measurement device D1, to an antenna of the on-board range measurement device D2, and to an internal component (e.g., MCU/CPU) of the on-board range measurement device D2 is measured. A second TOT for a signal to travel from an internal component (e.g., MCU/CPU) of the on-board range measurement device D1, to an antenna of the on-board range measurement device D1, to an antenna of the on-board range measurement device D6, and to an internal component (e.g., MCU/CPU) of the on-board range measurement device D6 is measured. A third TOT for a signal to travel from an internal component (e.g., MCU/CPU) of the on-board range measurement device D1, to an antenna of the on-board range measurement device D1, to an antenna of the on-board range measurement device D5, and to an internal component (e.g., MCU/CPU) of the on-board range measurement device D5 is measured and stored.

The first pre-determined time is compared with the first TOT, the second pre-determined time is compared with the second TOT, and the third pre-determined time is compared with the third TOT. If all three comparisons are within an acceptable error range then the on board range measurement devices D1, D2, D5, D6 are calibrated. If any one of the comparisons is within an acceptable error range, then the on-board range measurement device D1 and the other on-board range measurement device that had the acceptable error range are healthy. TOTs for the other on-board range measurement device should be compared to predetermined times to determine which of these other on board range measurement devices is unhealthy and are to be recalibrated.

For example, suppose that all three comparisons of TOTs and predetermined times were outside the error range. In this case, it is unclear whether all of the on-board range measurement devices D1, D2, D5, D6 are unhealthy, on-board range measurement device D1 is unhealthy while on-board range measurement devices D2, D5, D6 are healthy, on-board range measurement device D1 is unhealthy and some but not all of on-board range measurement devices D2, D5, D6 are unhealthy or on-board range measurement device D1 is healthy and some but on-board range measurement devices D2, D5, D6 are unhealthy.

In this case, a fourth TOT is measured between on-board range measurement device D2 and on-board range measurement device D6 and compared to a corresponding predetermined time. A fifth TOT is measured between on-board range measurement device D2 and on-board range measurement device D5 and compared to a corresponding predetermined time. A sixth TOT is measured between on-board range measurement device D6 and on-board range measurement device D5 and compared to a corresponding predetermined time. By determining which combinations of TOTs and pre-determined times are within the acceptable error ranges and which combinations are outside the acceptable error ranges, a user logically deduced which of the on-board range measurement devices D1 D2, D5, D6 are calibrated and which of the on-board range measurement devices D1 D2, D5, D6 are uncalibrated.

Figure 6I:
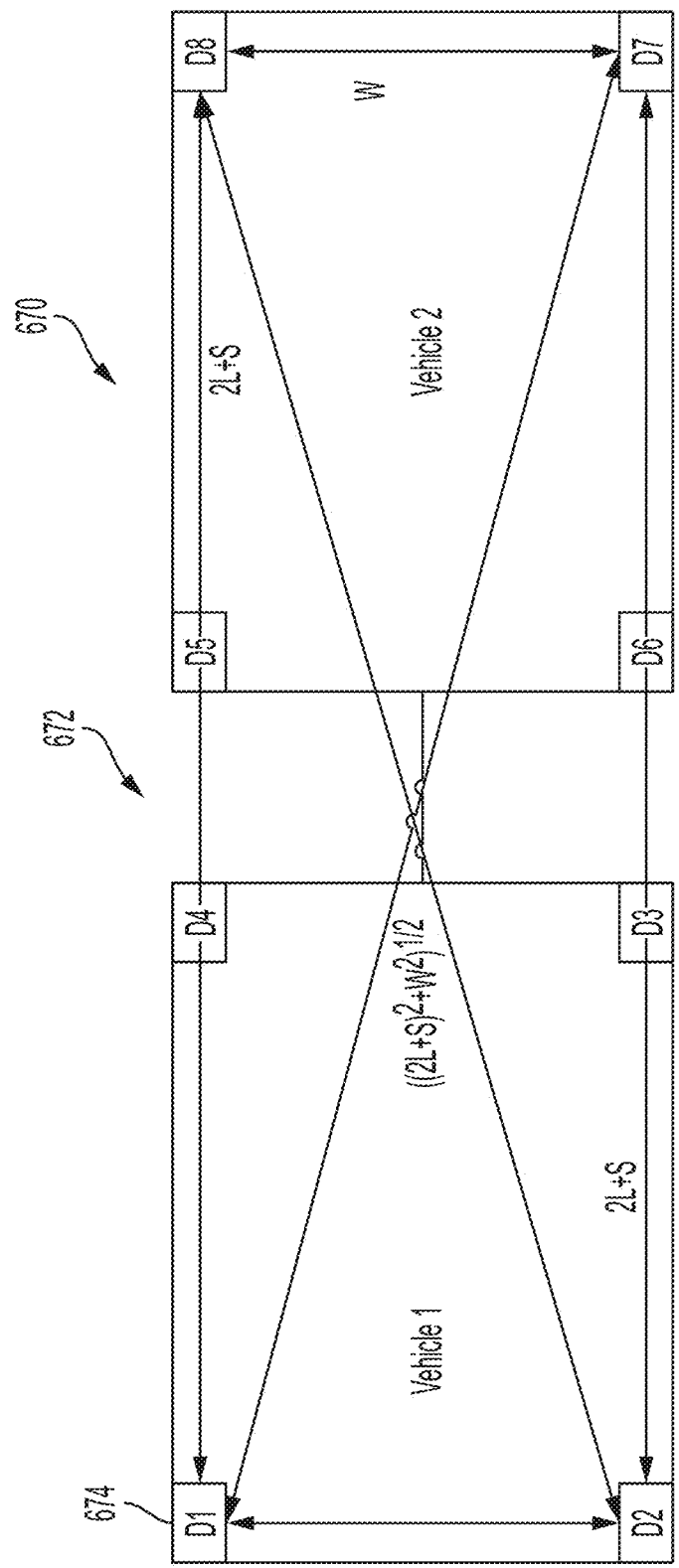

FIG. 6I is the range measurement system 670 for the vehicle 672 mounted on the guideway 654 is calibrated, in accordance with some embodiments.

In this embodiment, the vehicle 672 includes two units, unit 1 and unit 2. In the top right corner of unit 2, the vehicle 672 includes an on-board range measurement device D8. In the bottom right corner of unit 2, the vehicle 672 includes an on-board range measurement device D7. The length of unit 2 is L and the width of unit 2 is w. The distance between unit 1 and unit 2 is S. Thus, the range between D1 and D8 is 2L+S and the range between D2 and D7 is 2L+S. The range between D1 and D2 is w and the range between D7 and D8 is w. The range between D1 and D7 is the square root of 2L+S squared plus W squared. The range between D2 and D8 is the square root of 2L+S squared plus W squared.

A pre-determined time for a signal to travel from an internal component (e.g., MCU/CPU) of the on-board range measurement device D1, to an antenna of the on-board range measurement device D1, to an antenna of the on-board range measurement device D2, and to an internal component (e.g., MCU/CPU) of the on-board range measurement device D2 is measured and stored. A pre-determined time for a signal to travel from an internal component (e.g., MCU/CPU) of the on-board range measurement device D1, to an antenna of the on-board range measurement device D1, to an antenna of the on-board range measurement device D7, and to an internal component (e.g., MCU/CPU) of the on-board range measurement device D7 is measured and stored. A pre-determined time for a signal to travel from an internal component (e.g., MCU/CPU) of the on-board range measurement device D1, to an antenna of the on-board range measurement device D1, to an antenna of the on-board range measurement device D8, and to an internal component (e.g., MCU/CPU) of the on-board range measurement device D8 is measured and stored. A pre-determined time for a signal to travel from an internal component (e.g., MCU/CPU) of the on-board range measurement device D2, to an antenna of the on-board range measurement device D2, to an antenna of the on-board range measurement device D7, and to an internal component (e.g., MCU/CPU) of the on-board range measurement device D7 is measured and stored. A pre-determined time for a signal to travel from an internal component (e.g., MCU/CPU) of the on-board range measurement device D2, to an antenna of the on-board range measurement device D2, to an antenna of the on-board range measurement device D8, and to an internal component (e.g., MCU/CPU) of the on-board range measurement device D8 is measured and stored. A pre-determined time for a signal to travel from an internal component (e.g., MCU/CPU) of the on-board range measurement device D7, to an antenna of the on-board range measurement device D7, to an antenna of the on-board range measurement device D8, and to an internal component (e.g., MCU/CPU) of the on-board range measurement device D8 is measured and stored.

During calibration, a first TOT for a signal to travel from an internal component (e.g., MCU/CPU) of the on-board range measurement device D1, to an antenna of the on-board range measurement device D1, to an antenna of the on-board range measurement device D2, and to an internal component (e.g., MCU/CPU) of the on-board range measurement device D2 is measured. A second TOT for a signal to travel from an internal component (e.g., MCU/CPU) of the on-board range measurement device D1, to an antenna of the on-board range measurement device D1, to an antenna of the on-board range measurement device D7, and to an internal component (e.g., MCU/CPU) of the on-board range measurement device D7 is measured. A third TOT for a signal to travel from an internal component (e.g., MCU/CPU) of the on-board range measurement device D1, to an antenna of the on-board range measurement device D1, to an antenna of the on-board range measurement device D8, and to an internal component (e.g., MCU/CPU) of the on-board range measurement device D8 is measured and stored.

The first pre-determined time is compared with the first TOT, the second pre-determined time is compared with the second TOT, and the third pre-determined time is compared with the third TOT. If all three comparisons are within an acceptable error range then the on board range measurement devices D1, D2, D7, D8 are calibrated. If any one of the comparisons is within an acceptable error range, then the on-board range measurement device D1 and the other on-board range measurement device that had the acceptable error range are healthy. TOTs for the other on-board range measurement device should be compared to predetermined times to determine which of these other on board range measurement devices is unhealthy and are to be recalibrated.

For example, if all three comparisons of TOTs and pre-determined times are outside the error range. In this case, it is unclear whether all of the on-board range measurement devices D1, D2, D8, D7 are unhealthy, on-board range measurement device D1 is unhealthy while on-board range measurement devices D2, D8, D7 are healthy, on-board range measurement device D1 is unhealthy and some but not all of on-board range measurement devices D2, D8, D7 are unhealthy or on-board range measurement device D1 is healthy and some but on-board range measurement devices D2, D8, D7 are unhealthy.

In this case, a fourth TOT is measured between on-board range measurement device D2 and on-board range measurement device D7 and compared to a corresponding predetermined time. A fifth TOT is measured between on-board range measurement device D2 and on-board range measurement device D8 and compared to a corresponding predetermined time. A sixth TOT is measured between on-board range measurement device D7 and on-board range measurement device D8 and compared to a corresponding predetermined time. By determining which combinations of TOTs and pre-determined times are within the acceptable error ranges and which combinations are outside the acceptable error ranges, a user logically deduced which of the on-board range measurement devices D1 D2, D8, D7 are calibrated and which of the on-board range measurement devices D1 D2, D8, D7 are uncalibrated.

Figure 7:
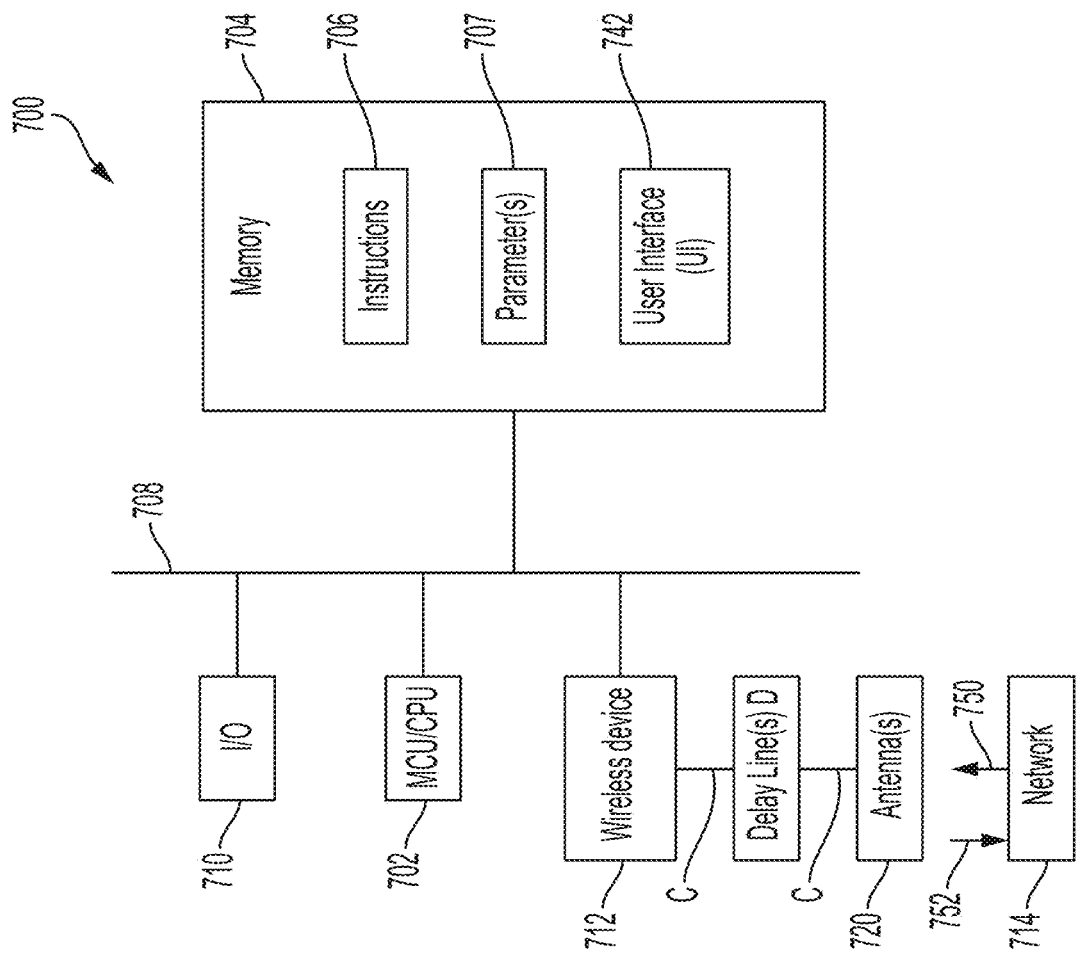
FIG. 7 is a block diagram of an on-board range measurement device 700, in accordance with some embodiments.

FIG. 7 is a block diagram of an on-board range measurement device 700, in accordance with some embodiments.

In some embodiments, the on-board range measurement device 700 corresponds with on-board range measurement device 106 in FIGS. 1A-1C, on-board range measurement devices 206(1), 206(2) in FIG. 3, on-board range measurement devices 306(1), 306(2), 306(3), 306(4) in FIG. 3, on-board range measurement devices 406(1), 406(2) in FIGS. 4A-4E, on-board range measurement devices 506(1), 506(2) in FIGS. 5A-5E.

In some embodiments, on-board range measurement device 700 includes a computing device including a hardware MCU/CPU 702 and a non-transitory, computer-readable storage medium 704. Storage medium 704, amongst other things, is encoded with, i.e., stores, computer program code 706, i.e., a set of executable instructions. Execution of instructions 706 by hardware MCU/CPU 702 represents (at least in part) an vehicle localization and speed determination tool which implements a portion or all of the methods described herein in accordance with one or more embodiments (hereinafter, the noted processes and/or methods).

MCU/CPU 702 is electrically coupled to computer-readable storage medium 704 via a bus 708. MCU/CPU 702 is also electrically coupled to an I/O interface 710 by bus 708. A wireless device 712 is also electrically connected to MCU/CPU 702 via bus 708. Wireless device 712 is connected to a network 714, so that MCU/CPU 702 and computer-readable storage medium 704 are capable of connecting to external elements via network 714. MCU/CPU 702 is configured to execute computer program code 706 encoded in computer-readable storage medium 704 in order to cause system 700 to be usable for performing a portion or all of the noted processes and/or methods. In one or more embodiments, MCU/CPU 702 is a central processing unit (CPU), a multi-MCU/CPU, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause system 700 to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of parameters (e.g. range estimations, TOT, propagation delay data, scaling factor, etc.) as disclosed herein.

On-board range measurement device 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to MCU/CPU 702.

On-board range measurement device 700 also includes wireless device 712 coupled to MCU/CPU 702. Wireless device 712 allows system 700 to communicate with network 714, to which one or more other computer systems are connected. Wireless device 712 includes wireless network interfaces such as BLUETOOTH, WIFI, LTE, 5G, WIMAX, GPRS, or WCDMA. In one or more embodiments, a portion or all of noted processes and/or methods, is implemented in two or more systems 700.

On-board range measurement device 700 is configured to receive information through I/O interface 710. The information received through I/O interface 710 includes one or more of instructions, data, and/or other parameters for processing by MCU/CPU 702. The information is transferred to MCU/CPU 702 via bus 708. On-board range measurement device 700 is configured to receive information related to a UI through I/O interface 710. The information is stored in computer-readable medium 704 as user interface (UI) 742.

The wireless device 712 is configured to receive a signal 750 via one or more antennas 720. In some embodiments, the signal 750 includes a carrier signal that is modulated with one or more information bearing signals. In some embodiments, the wireless device 712 is configured to demodulate the signal 750 so that information of the information bearing signal(s). In some embodiments, the information of the information bearing signal(s) is transformed into parameters in library 707 that is readable by a computer and stored in the computer-readable storage medium 704. In some embodiments, signal 750 corresponds with signals 118, 122 in FIG. 1B.

The wireless device 712 is configured to transmit a signal 752 via one or more antennas 720. In some embodiments, the signal 752 includes a carrier signal that is modulated with one or more information bearing signals. In some embodiments, the wireless device 712 is configured to modulate the signal 752 so that information of the information bearing signal(s). In some embodiments, the information of the information bearing signal(s) is received from parameters in library 707 that is readable by a computer and stored in the computer-readable storage medium 704. In some embodiments, signal 752 corresponds with signals 116, 120 in FIG. 1B. In some embodiments, the wireless device 712 is connected to the antenna(s) 720 through one or more delay lines D that are configured to introduce one or more variable delays and one or more coaxial cables C. The variable delay of the delay lines D is varied in order to calibrate the on-board range measurement device 700.

In some embodiments, a portion or all of the noted processes and/or methods is implemented as a standalone software application for execution by a MCU/CPU, which in some embodiments includes at least one processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

Figure 8:
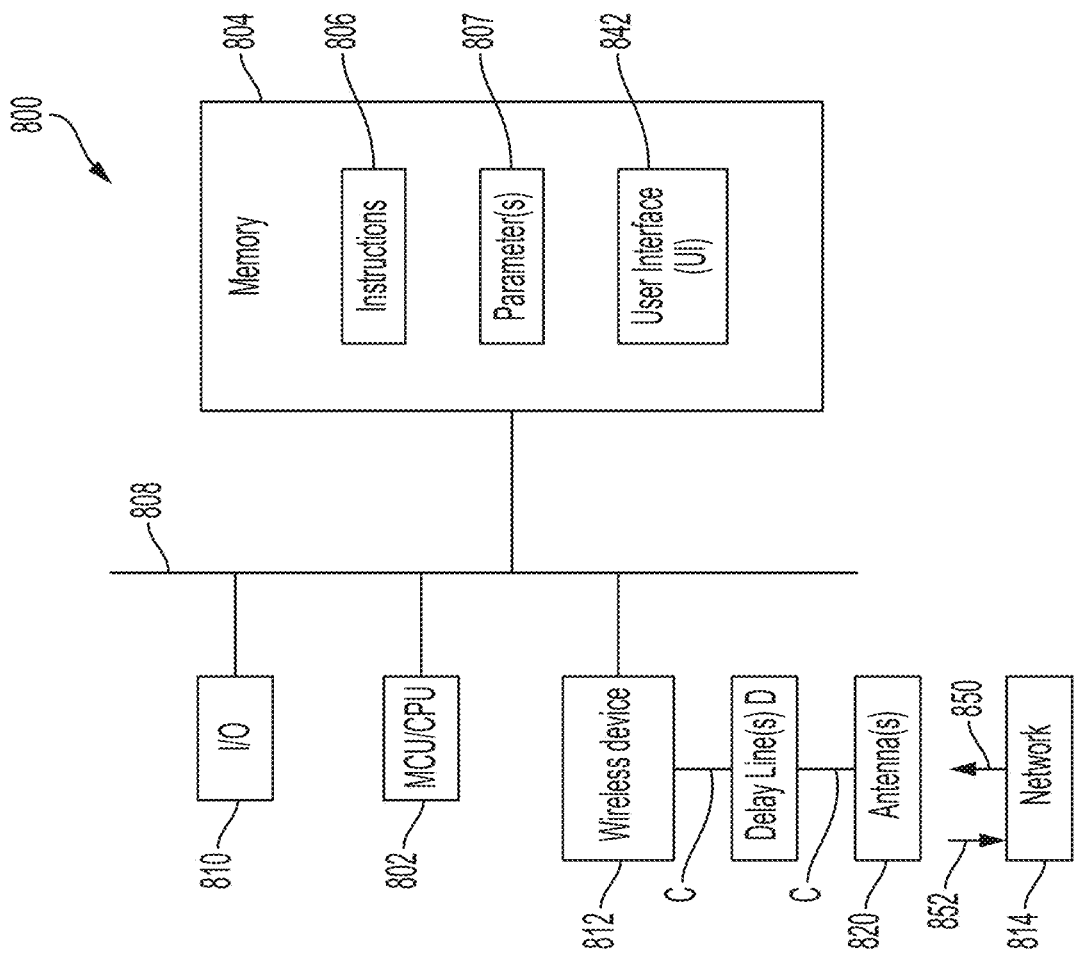
FIG. 8 is a block diagram of a wayside range measurement device, in accordance with some embodiments.

FIG. 8 is a block diagram of a wayside range measurement device 800, in accordance with some embodiments.

In some embodiments, the wayside range measurement device 800 corresponds with wayside range measurement device 108 in FIG. 1A, 1B, wayside range measurement devices 108(1), 108(2) in FIG. 1C, wayside range measurement devices 408(1), 408(2) in FIGS. 4A-4E, and wayside range measurement devices 608(1), 608(2), 656, 658, 660 in FIGS. 6A-6F.

In some embodiments, wayside range measurement device 800 includes a computing device including a hardware MCU/CPU 802 and a non-transitory, computer-readable storage medium 804. Storage medium 804, amongst other things, is encoded with, i.e., stores, computer program code 806, i.e., a set of executable instructions. Execution of instructions 806 by hardware MCU/CPU 802 represents (at least in part) an vehicle localization and speed determination tool which implements a portion or all of the methods described herein in accordance with one or more embodiments (hereinafter, the noted processes and/or methods).

MCU/CPU 802 is electrically coupled to computer-readable storage medium 804 via a bus 808. MCU/CPU 802 is also electrically coupled to an I/O interface 810 by bus 808. A wireless device 812 is also electrically connected to MCU/CPU 802 via bus 808. Wireless device 812 is connected to a network 814, so that MCU/CPU 802 and computer-readable storage medium 804 are capable of connecting to external elements via network 814. MCU/CPU 802 is configured to execute computer program code 806 encoded in computer-readable storage medium 804 in order to cause system 800 to be usable for performing a portion or all of the noted processes and/or methods. In one or more embodiments, MCU/CPU 802 is a central processing unit (CPU), a multi-MCU/CPU, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause system 800 to be usable for performing a portion or all of the noted processes and/or methods. In one or more embodiments, storage medium 804 also stores information which facilitates performing a portion or all of the noted processes and/or methods. In one or more embodiments, storage medium 804 stores library 807 of parameters (e.g., range estimations, TOT, propagation delay data, scaling factor, etc.) as disclosed herein.

Wayside range measurement device 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to MCU/CPU 802.

Wayside range measurement device 800 also includes wireless device 812 coupled to MCU/CPU 802. Wireless device 812 allows system 800 to communicate with network 814, to which one or more other computer systems are connected. Wireless device 812 includes wireless network interfaces such as BLUETOOTH, WIFI, LTE, 5G, WIMAX, GPRS, or WCDMA. In one or more embodiments, a portion or all of noted processes and/or methods, is implemented in two or more systems 800.

Wayside range measurement device 800 is configured to receive information through I/O interface 810. The information received through I/O interface 810 includes one or more of instructions, data, and/or other parameters for processing by MCU/CPU 802. The information is transferred to MCU/CPU 802 via bus 808. Wayside range measurement device 800 is configured to receive information related to a UI through I/O interface 810. The information is stored in computer-readable medium 804 as user interface (UI) 842.

The wireless device 812 is configured to receive a signal 850 via one or more antennas 820. In some embodiments, the signal 850 includes a carrier signal that is modulated with one or more information bearing signals. In some embodiments, the wireless device 812 is configured to demodulate the signal 850 so that information of the information bearing signal(s). In some embodiments, the information of the information bearing signal(s) is transformed into parameters in library 807 that is readable by a computer and stored in the computer-readable storage medium 804. In some embodiments, signal 850 corresponds with signals 118, 122 in FIG. 1B.

The wireless device 812 is configured to transmit a signal 852 via one or more antennas 820. In some embodiments, the signal 852 includes a carrier signal that is modulated with one or more information bearing signals. In some embodiments, the wireless device 812 is configured to modulate the signal 852 so that information of the information bearing signal(s). In some embodiments, the information of the information bearing signal(s) is received from parameters in library 807 that is readable by a computer and stored in the computer-readable storage medium 804. In some embodiments, signal 852 corresponds with signals 116, 120 in FIG. 1B. In some embodiments, the wireless device 812 is connected to the antenna(s) 820 through one or more delay lines D that are configured to introduce one or more variable delays and one or more coaxial cables C. The variable delay of the delay lines D is varied in order to calibrate the wayside range measurement device 800.

In some embodiments, a portion or all of the noted processes and/or methods is implemented as a standalone software application for execution by a MCU/CPU, which in some embodiments includes at least one processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

Figure 9:
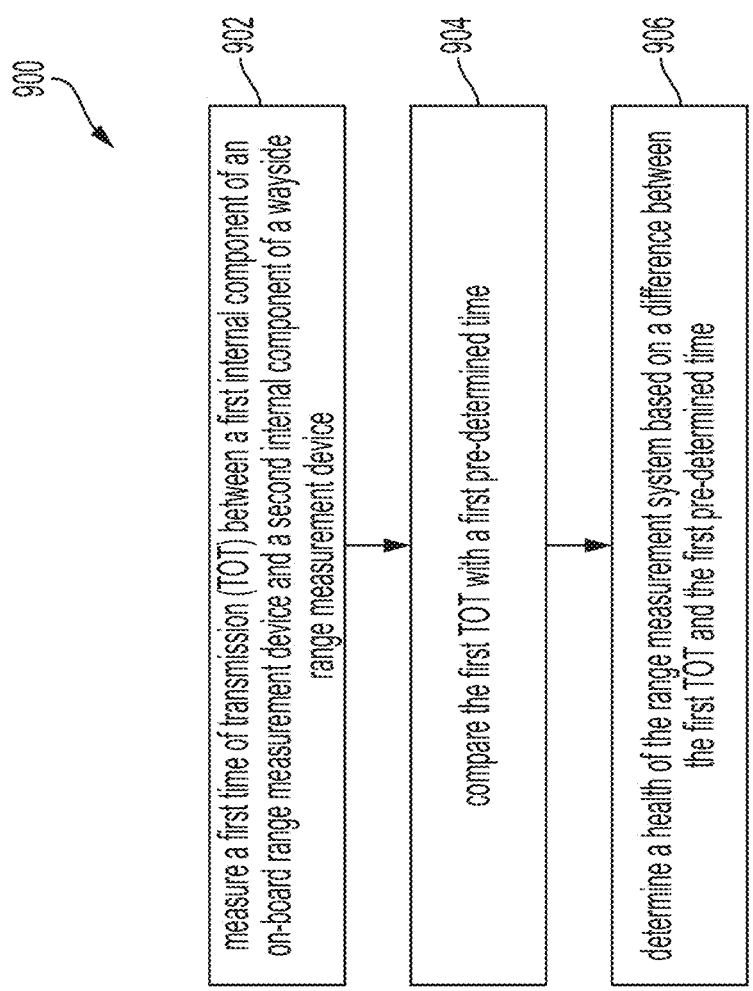
FIG. 9 is a flowchart of a method of calibrating a range measurement system for a vehicle mounted on a guideway, in accordance with some embodiments.

FIG. 9 is a flowchart 900 of a method of calibrating a range measurement system for a vehicle mounted on a guideway, in accordance with some embodiments.

Flowchart 900 includes blocks 902-906. In some embodiments, blocks 902-906 are performed by an on-board range measurement device, such as on-board range measurement device 106 in FIGS. 1A-1C, on-board range measurement devices 206(1), 206(2) in FIG. 3, on-board range measurement devices 306(1), 306(2), 306(3), 306(4) in FIG. 3, on-board range measurement devices 406(1), 406(2) in FIGS. 4A-4E, on-board range measurement devices 506(1), 506(2) in FIGS. 5A-5E, or on-board range measurement device 700 in FIG. 7. In some embodiments, blocks 902-906 are performed by a wayside range measurement device, such as wayside range measurement device 108 in FIG. 1A, 1B, wayside range measurement devices 108(1), 108(2) in FIG. 1C, wayside range measurement devices 408(1), 408(2) in FIGS. 4A-4E, wayside range measurement devices 608(1), 608(2) in FIGS. 6A-6E, and wayside range measurement device 800 in FIG. 8. In some embodiments, at least one of blocks 902-906 is performed by the on-board range measurement device and at least one of blocks 902-906 is performed by the wayside range measurement device. Flow begins at block 900.

At block 902, a first TOT is measured between a first internal component of an on-board range measurement device and a second internal component of a wayside range measurement device. In some embodiments, the first internal component is an MCU/CPU of the on-board range measurement device. In some embodiments, the second internal component is an MCU/CPU of the wayside range measurement device. In some embodiments, a signal is transmitted wirelessly from an antenna of the on-board range measurement device and an antenna of the wayside range measurement device. In some embodiments, coaxial cables are connected between the antennas and the MCU/CPUs of the on-board and/or the wayside range measurement device. Flow then proceeds to block 904

At block 904, the first TOT is compared with a first pre-determined time. Flow then proceeds to block 906. In some embodiments, the first pre-determined time is an expected time when the system is calibrated. Flow then proceeds with block 906.

At block 906, a health of the range measurement system is determined based on a difference between the first TOT and the first pre-determined time. In some embodiments, it is determined that the range measurement system is to be calibrated when the difference between the first TOT and the first pre-determined time is greater than a threshold. When the difference between the first TOT and the first pre-determined time is greater than a threshold, a calibration is performed. In some embodiments, it is determined that the range measurement system will not be calibrated when the difference between the first TOT and the first pre-determined time is less than the threshold.

Figure 10:
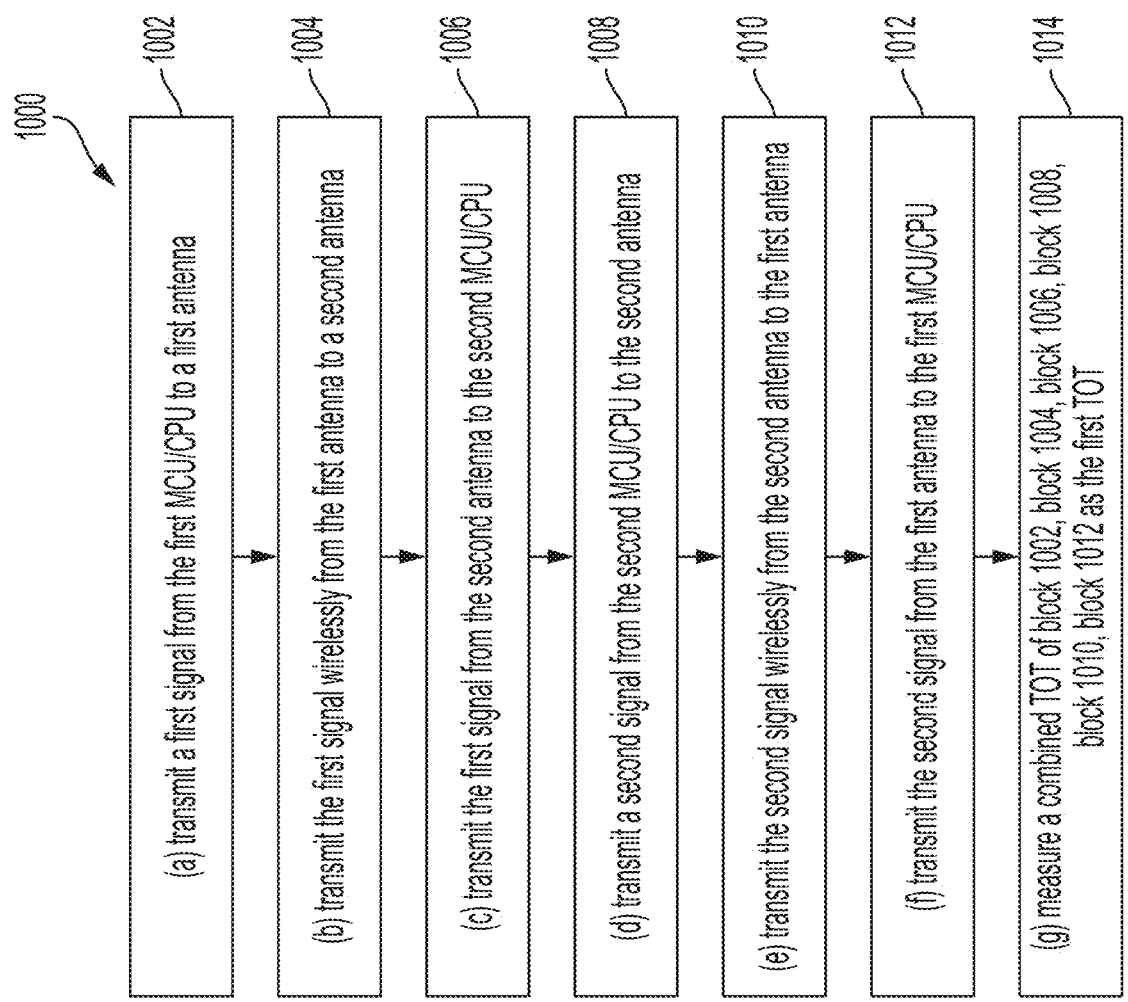
FIG. 10 is a flowchart for a method of measuring a TOT, in accordance with some embodiments.

FIG. 10 is a flowchart 1000 for a method of measuring a TOT.

Flowchart 1000 includes blocks 1002-block 1014. Flowchart 1000 is one method for performing block 902 in FIG. 9 Blocks 1002-1014 are labeled (a)-(g) in order to be able to identify each block in other blocks.

Flow begins at block 1002. At block 1002, a first signal is transmitted from the first MCU/CPU of the on-board range measurement device to the first antenna. An example of the first MCU/CPU is shown as MCU/CPU 702 in FIG. 7. An example of the first signal is shown as signals 116, 118 in FIG. 1B and signal 752 in FIG. 7. Examples of the first antenna includes antennas A1, A2 in FIGS. 1B, 1C, 2, 4A-4E, 5A-5E, and antenna 720 in FIG. 7. Flow then proceeds to block 1004.

At block 1004, the first signal is transmitted wirelessly from the first antenna to a second antenna of the wayside device. Examples of the second antenna include antennas A1, A2 in FIGS. 6A-6E and antenna 820 in FIG. 8. Flow then proceeds to block 1006.

At block 1006, the first signal is transmitted from the second antenna to the second MCU/CPU of the wayside range measurement device. An example of the second MCU/CPU includes MCU/CPU 802 in FIG. 8. Flow then proceeds to block 1008.

At block 1008, a second signal is transmitted from the second MCU/CPU to the second antenna. Examples of the second signal include signal 120, 122 in FIG. 1B and signal 852 in FIG. 8. Flow then proceeds to block 1010.

At block 1010, the second signal is wirelessly transmitted wirelessly from the second antenna to the first antenna. Flow then proceeds to block 1012.

At block 1012, the second signal is transmitted from the first antenna to the first MCU/CPU of the on-board range measurement device. Flow then proceeds to block 1014.

At block 1014, a combined TOT of block 1002, block 1004, block 1006, block 1008, block 1010, block 1012 is measured as the first TOT.

Figure 11:
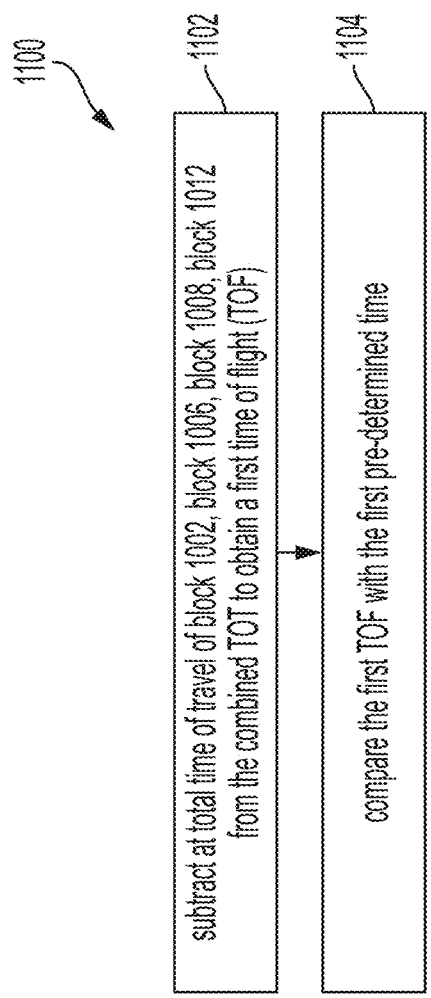
FIG. 11 is a flowchart of a method of comparing the first TOT with the first pre-determined time, in accordance with some embodiments.

FIG. 11 is a flowchart 1100 of a method of comparing the first TOT with the first pre-determined time.

Flowchart 1100 includes blocks 1102-1104. Flowchart 1100 is one embodiment of block 904 with respect to FIG. 9 and assumes that procedures in flowchart 1000 in FIG. 10 have been performed. Flow begins at block 1102.

At block 1102, all propagation delays of block 1002, block 1006, block 1008, block 1012 flowchart 1000 is subtracted from the combined TOT to obtain a first time of flight (TOF). The propagation delays of block 1002, block 1006, block 1008, block 1012 flowchart 1000 corresponds with the delays T1, T2 discussed with respect to FIG. 1A-1C discussed above. Flow then proceeds to block 1104.

At block 1104, the first TOF is compared with the first pre-determined time. This corresponds with comparing $TOF_{measured}$ with $TOF_{calibrated}$, as discussed above with respect to FIG. 1B.

Figure 12:
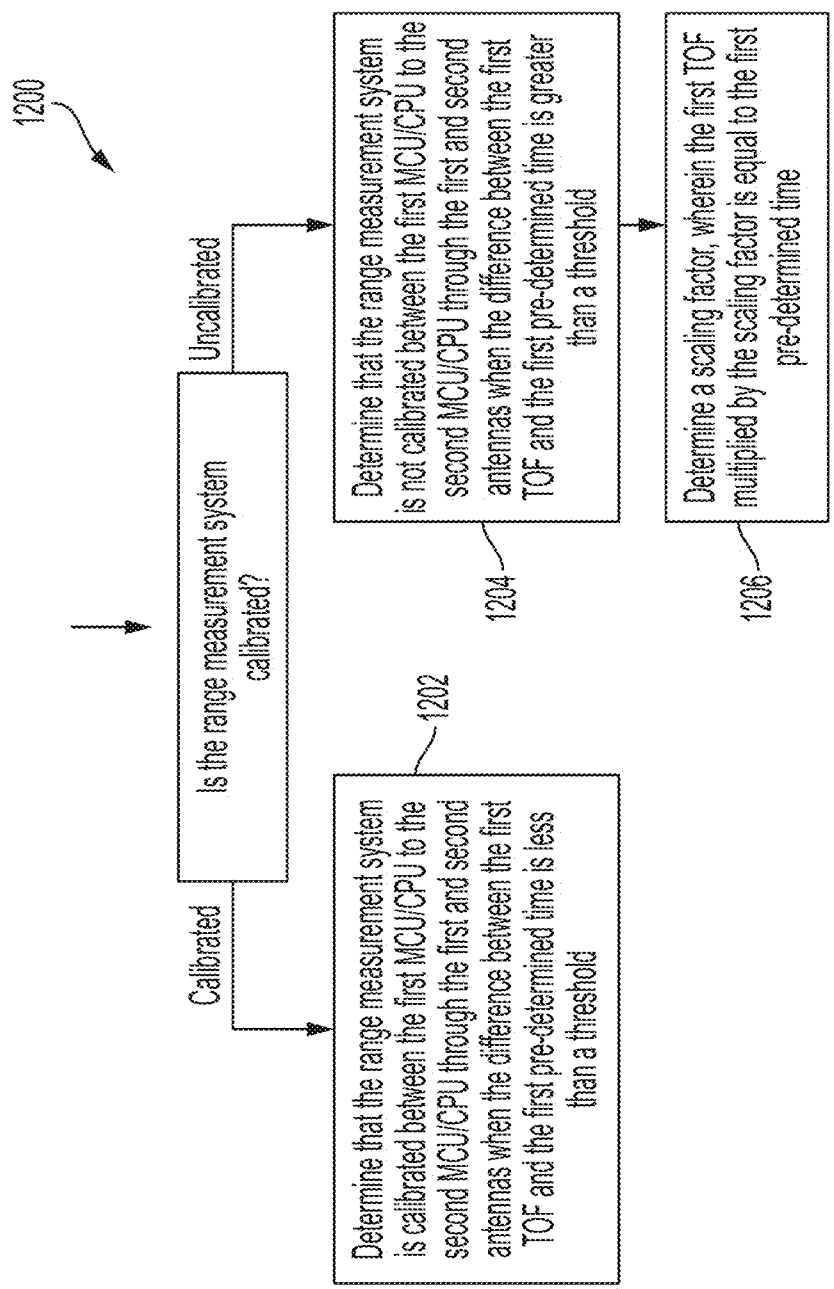
FIG. 12 is a flowchart of a method of determining the health of the range measurement system based on the difference between the first TOT and the first pre-determined time, in accordance with some embodiments.

FIG. 12 is a flowchart 1200 of a method of determining the health of the range measurement system based on the difference between the first TOT and the first pre-determined time, in accordance with some embodiments.

Flowchart includes blocks 1202-1206. Flowchart 1200 is one embodiment of block 906 in FIG. 9. However, block 1202 is an alternative procedure to blocks 1204-1206. Block 1202 is performed when the range measurement system is calibrated while blocks 1204-1206 are uncalibrated. More specifically, block 1202 occurs when the difference between the first TOF and the first pre-determined time is less than a threshold (e.g., a permissible error). When the difference between the first TOF and the first pre-determined time is less than the threshold, the range measurement system has the appropriate internal propagation delays and thus the range measurement system is calibrated. Thus, block 1202 occurs when the range measurement system is calibrated. Block 1204-1206 occurs when the difference between the first TOF and the first pre-determined time is greater than the threshold. When the difference between the first TOF and the first pre-determined time is greater than the threshold, the internal propagation delays of the range measurement system are not as expected and thus the range measurement system is uncalibrated. Thus, block 1202 occurs when the range measurement system is calibrated.

At block 1202, the range measurement system is determined to be calibrated between the first MCU/CPU to the second MCU/CPU through the first (of the on-board measurement device) and second antennas (of the wayside range measurement device) when the difference between the first TOF and the first pre-determined time is less than a threshold. If the range measurement system is uncalibrated then blocks 1204-1206 are performed.

At block 1204, the range measurement system is determined not to be calibrated between the first MCU/CPU to the second MCU/CPU through the first (of the on-board measurement device) and second antennas (of the wayside range measurement device) when the difference between the first TOF and the first pre-determined time is greater than a threshold. Flow then proceeds to block 1206.

At block 1206, a scaling factor is determined, wherein the first TOF multiplied by the scaling factor is equal to the first pre-determined time. The scaling factor calibrates the range measurement system as it ensures that future TOF measurements are multiplied by the same scaling factor to ensure that the delays are appropriately calibrated. In some embodiments, the scaling factor is stored in the memory 704 of the on-board range measurement device 700 so that the on-board range measurement device 700 scales future TOF measurement by the scaling factor. In some embodiments, the scaling factor is stored in the memory 804 of the wayside range measurement device 800 so that the wayside range measurement device 800 scales future TOF measurement by the scaling factor.

Figure 13:
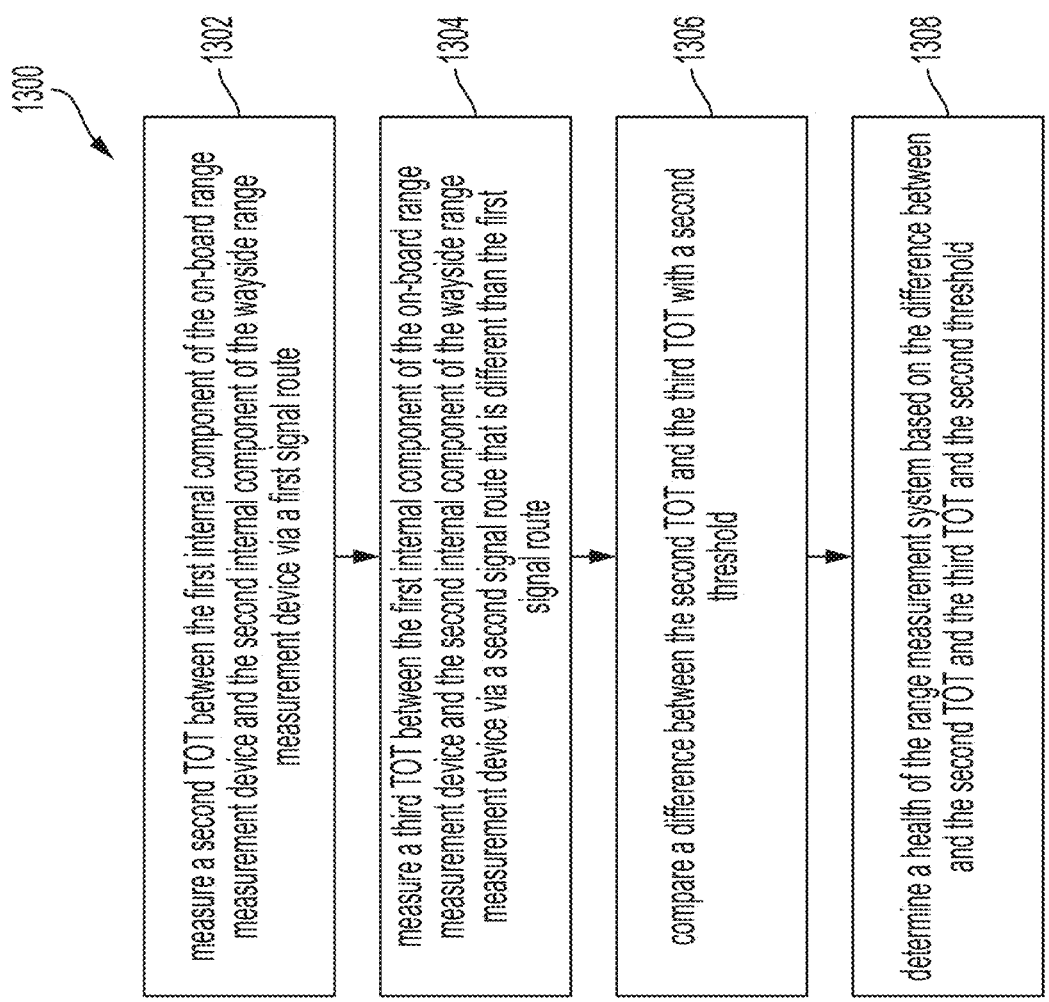
FIG. 13 is a flowchart of a method of calibrating a range measurement system, in accordance with some embodiments.

FIG. 13 is a flowchart 1300 of a method of calibrating a range measurement system, in accordance with some embodiments.

Flowchart 1300 includes blocks 1302-1308. In some embodiments, flowchart 1300 is performed instead of flowchart 900. In some embodiments, flowchart 1300 is performed in addition to flowchart 900. Flow begins at block 1302.

At block 1302, a second TOT is measured between the first internal component of the on-board range measurement device and the second internal component of the wayside range measurement device via a first signal route. For example, a TOT is measured when the range measurement system is set up as shown in FIG. 4A so that a signal propagates between the on-board range measurement device 406(1) and the antenna A1. Flow then proceeds to block 1304.

At block 1304, a third TOT is measured between the first internal component of the on-board range measurement device and the second internal component of the wayside range measurement device via a second signal route that is different than the first signal route. For example, a TOT is measured when the range measurement system is set up as shown in FIG. 4B so that a signal propagates between the on-board range measurement device 406(1) and the antenna A2. Flow then proceeds to block 1306.

At block 1306, a difference between the second TOT and the third TOT with a second threshold. In some embodiments, the distance between the two antennas is known in addition to the distance to the antennas of the wayside device. Therefore, if the internal components of the range measurement system are calibrated, the difference between the second TOT and the third TOT should also result in a value that is expected. In some embodiments, the threshold is equivalent to 15 cm divided by the speed of light c. Flow then proceeds to block 1308.

At block 1308, a health of the range measurement system is determined based on the difference between and the second TOT and the third TOT and the threshold. In some embodiments, when the difference between and the second TOT and the third TOT and the threshold is greater than the threshold, an internal component of the range measurement system is to be changed. For example, a coaxial cable is changed to provide calibration.

Figure 14:
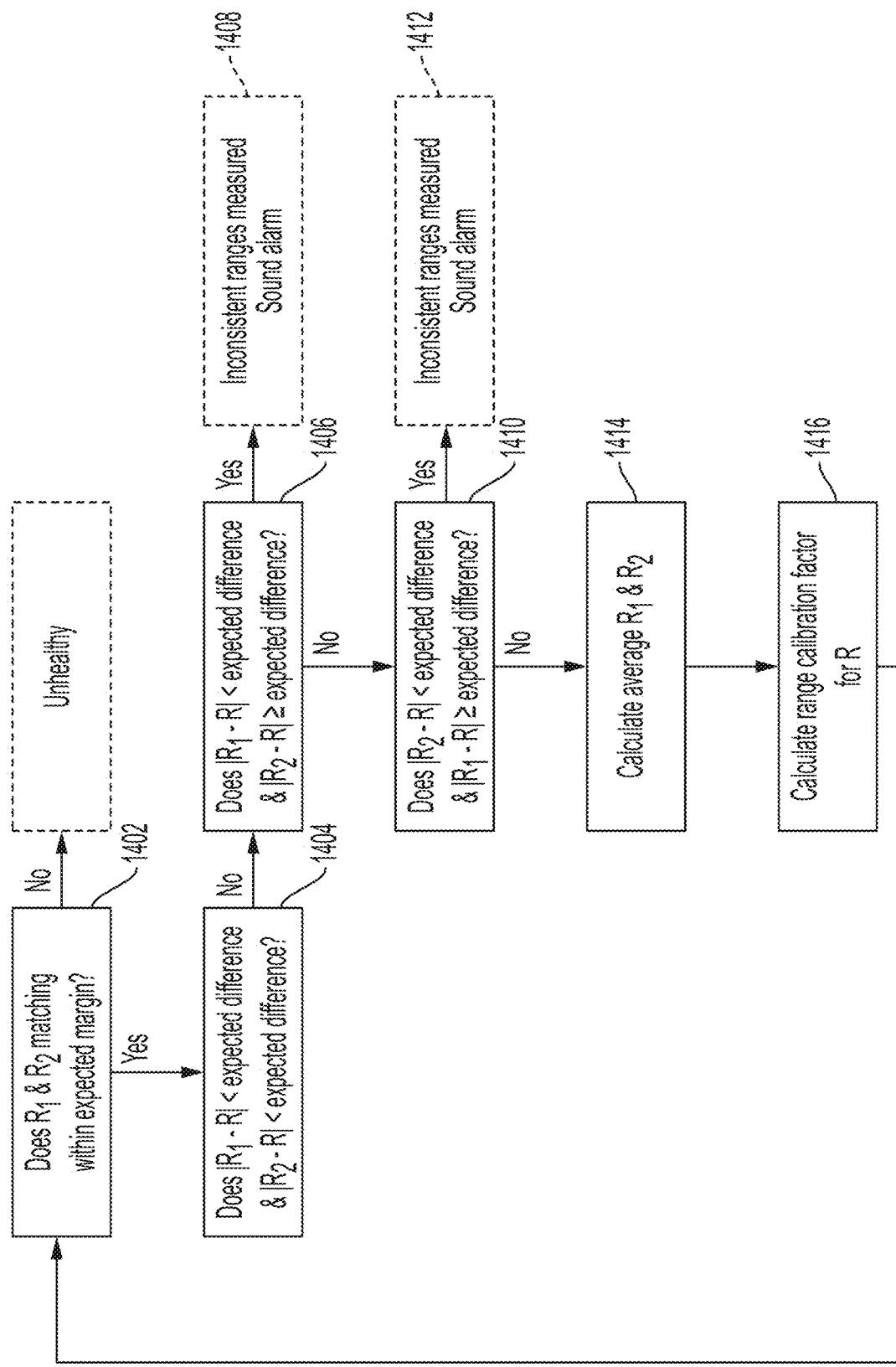
FIG. 14 is a flowchart of a method of performing calibration on a range measurement system, in accordance with some embodiments.

FIG. 14 is a flowchart 1400 of a method of performing calibration on a range measurement system, in accordance with some embodiments.

Flowchart includes blocks 1402-1418, in accordance with some embodiments. Flow begins at block 1402.

At block 1402, whether $R_1$ and $R_2$ are within an expected margin is determined. Block 1402 presumes that the procedures described above with respect to flowchart 1300 are performed. TOFs are compared with a threshold indirectly as $R_1$ corresponds with one of the TOFs multiplied by the speed of light and $R_2$ corresponds with the other TOF multiplied by the speed of light. If the difference between $R_1$ and $R_2$ is greater than an expected margin (i.e., a threshold), then the system is determined to be unhealthy (i.e., uncalibrated). Otherwise, flow proceeds to block 1404.

At block 1404, whether $R_1$ is less than a threshold R is determined and whether $R_2$ is less than the threshold R is determined. In some embodiments $R_1$ and $R_2$ are the same $R_1$ and $R_2$ described above in block 1402. In other embodiments, the procedures described in block 900 are performed to determine $R_1$ and the procedures described in block 900 are performed again along a different signal rout to determine $R_2$. If the threshold both $R_1$ and $R_2$ are less than the threshold R, then the range measurement system is healthy. If not flow proceeds to block 1406.

At block 1406, whether $R_1$ is less its threshold R but whether $R_2$ is greater than its threshold R is determined. If so, then flow proceeds to block 1408 where an alarm is sounded, or sent to a maintenance terminal or central control, since something is wrong internally with the range measurement system.

At block 1410, whether $R_1$ is greater its threshold R but whether $R_2$ is less than its threshold R is determined. If so, then flow proceeds to block 1412 where an alarm is sounded, or sent to a maintenance terminal or central control, since something is wrong internally with the range measurement system. Flow then proceeds to block 1414. Proceeding to block 1414 means that both $R_1$ is greater the threshold R and $R_2$ is less than is greater than the threshold R.

At block 1414, an average between $R_1$ and $R_2$ is determined. Flow then proceeds to block 1416.

At block 1416, a range calibration factor is determine for the threshold R. In some embodiments, the range calibration factor multiplied by the average of $R_1$ and $R_2$ is equal to R. In this manner, the range calibration system is calibrated so that future measurements are multiplied by the range calibration factor. Procedures 1402-1416 are repeated in some embodiments at different ranges. For example, the procedures in 1402-1416 are repeated for ranges from 5 m (minimum range) to 100 m (maximum range) in 5 m steps.

Figure 15:
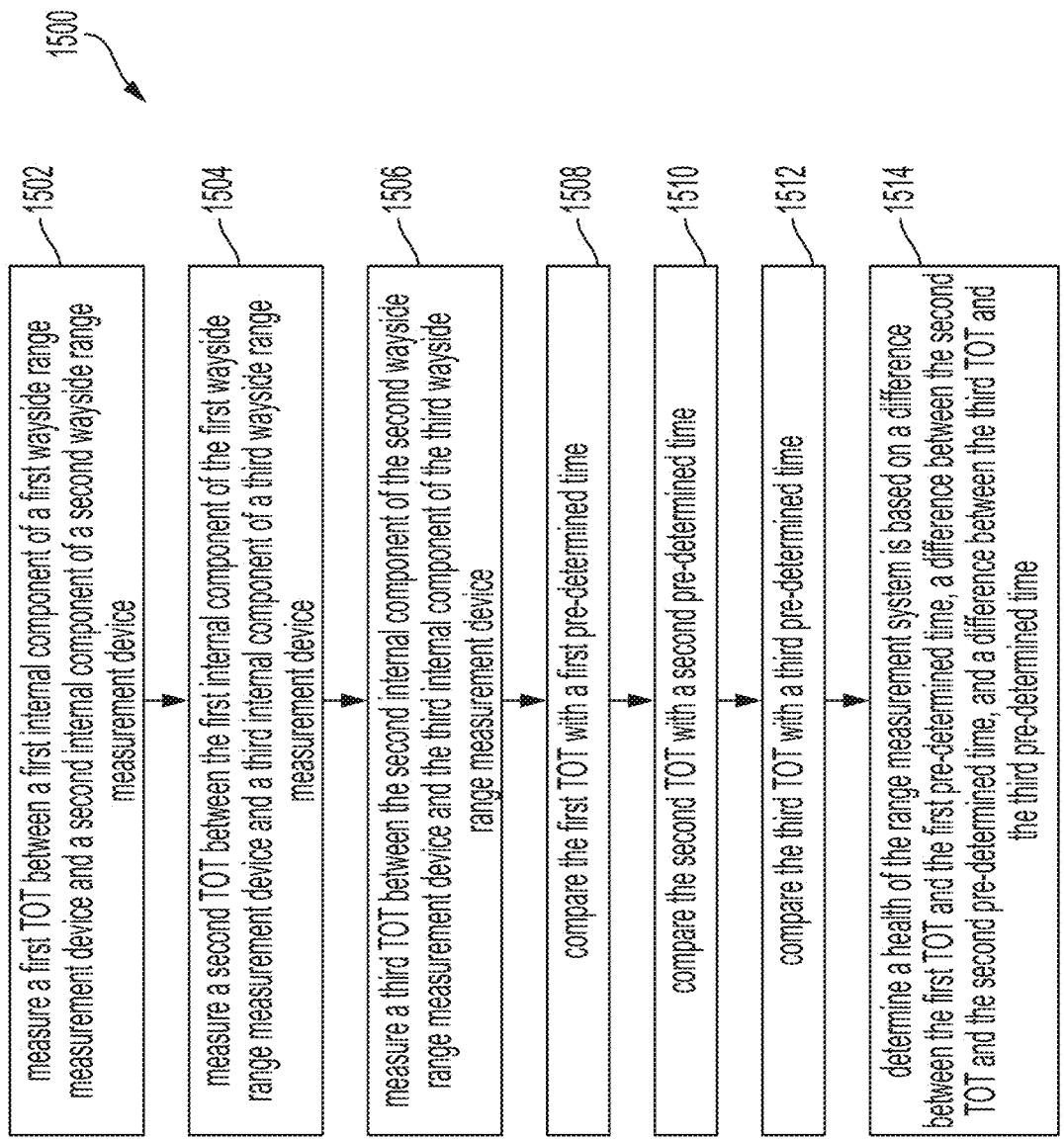
FIG. 15 is a flowchart of a method of performing calibration on a range measurement system, in accordance with some embodiments.

FIG. 15 is a flowchart 1500 of a method of performing calibration on a range measurement system, in accordance with some embodiments.

Flowchart 1500 includes blocks 1502-1514. Flow beings at block 1502. In this case, the range between each pair of wayside range measurement devices are static and known.

At block 1502, a first TOT is measured between a first internal component of a first wayside device and a second internal component of a second wayside range measurement device. An example of block 1502 is discussed with respect to FIG. 6F where a TOT is measured between the wayside range measurement device 656 and the wayside range measurement device 658. Flow then proceeds to block 1504.

At block 1504, a second TOT is measured between the first internal component of the first wayside device and a third internal component of a third wayside range measurement device. An example of block 1504 is discussed with respect to FIG. 6F where a TOT is measured between the wayside range measurement device 656 and the wayside range measurement device 660. Flow then proceeds to block 1506.

At block 1506, a third TOT is measured between the second internal component of the second wayside device and the third internal component of the third wayside range measurement device. An example of block 1506 is discussed with respect to FIG. 6F where a TOT is measured between the wayside range measurement device 658 and the wayside range measurement device 660. Flow then proceeds to block 1508.

At block 1508, the first TOT is compared with a first pre-determined time. An example of block 1508 is discussed with respect to FIG. 6F where the TOT measured between the wayside range measurement device 656 and the wayside range measurement device 658 is compared with a pre-determined time. Flow then proceeds to block 1510.

At block 1510, the second TOT is compared with a second pre-determined time. An example of block 1510 is discussed with respect to FIG. 6F where the TOT measured between the wayside range measurement device 656 and the wayside range measurement device 660 is compared with another pre-determined time. Flow then proceeds to block 1512.

At block 1512, the third TOT is compared with a third pre-determined time. An example of block 1512 is discussed with respect to FIG. 6F where the TOT measured between the wayside range measurement device 658 and the wayside range measurement device 660 is compared with yet another pre-determined time. Flow then proceeds to block 1514.

At block 1514, a health of the range measurement system is based on a difference between the first TOT and the first pre-determined time, a difference between the second TOT and the second pre-determined time, and a difference between the third TOT and the third predetermined time. An example of block 1514 is discussed with respect to FIG. 6F when the differences between the measured TOTs are compared to the pre-determined times.

Figure 16:
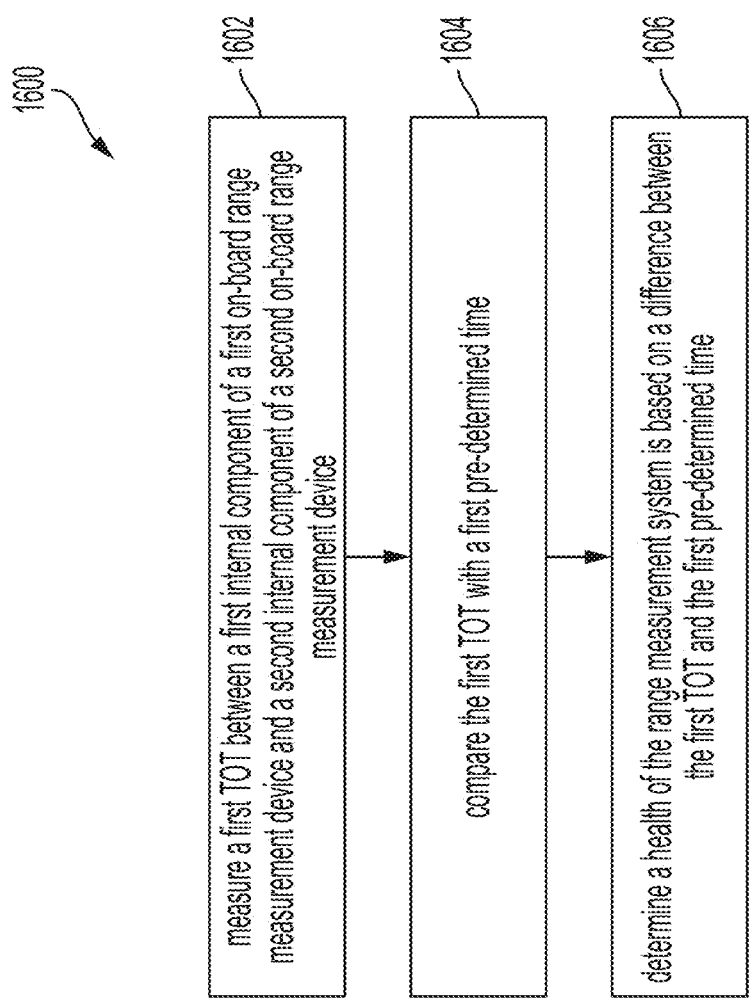
FIG. 16 is a flowchart of a method of performing calibration on a range measurement system, in accordance with some embodiments.

FIG. 16 is a flowchart 1600 of a method of performing calibration on a range measurement system, in accordance with some embodiments.

Flowchart 1600 includes blocks 1602-1606. Flow beings at block 1602. In this case, the range between each pair of on-board range measurement devices are static and known.

At block 1602, a first TOT is measured between a first internal component of a first on-board device and a second internal component of a second on-board range measurement device. An example of block 1602 is discussed with respect to FIGS. 6G-6I where a TOT is measured between the on-board range measurement device D1-D8 and another one of the on-board range measurement device D1-D8. Flow then proceeds to block 1604.

At block 1604, the first TOT is compared with a first pre-determined time. An example of block 1604 is discussed with respect to FIGS. 6G-6I where the TOT measured between a pair of the on-board range measurement devices D1-D8 is compared with a pre-determined time. Flow then proceeds to block 1606.

At block 1606, a health of the range measurement system is based on a difference between the first TOT and the first pre-determined time, An example of block 1606 is discussed with respect to FIG. 6G-6I when the differences between the measured TOTs are compared to the pre-determined times.

In some embodiments, a method of calibrating a range measurement system for a vehicle mounted on a guideway, the method including: measuring a first time of transmission (TOT) between a first internal component of an on-board range measurement device and a second internal component of a wayside range measurement device; comparing the first TOT with a first pre-determined time; and determining a health of the range measurement system based on a difference between the first TOT and the first pre-determined time. In some embodiments, the first internal component is a first central processing unit (CPU) or first microcontroller unit (MCU) (first MCU/CPU) and the second internal component is a second CPU or second MCU (second MCU/CPU). In some embodiments, measuring the first TOT includes: transmitting a first signal from the first MCU/CPU to a first antenna (first transmission); transmitting the first signal from the transmitting the first signal wirelessly from the first antenna to a second antenna (second transmission); transmitting the first signal from the second antenna to the second MCU/CPU (third transmission); transmitting a second signal from the second MCU/CPU to the second antenna (fourth transmission); transmitting the second signal wirelessly from the second antenna to the first antenna (fifth transmission); transmitting the second signal from the first antenna to the first MCU/CPU (sixth transmission); measuring a combined TOT of first transmission, the second transmission, the third transmission, the fourth transmission, the fifth transmission, and the sixth transmission as the first TOT. In some embodiments, comparing the first TOT with the first pre-determined time, includes: subtracting the internal propagation delays of first transmission, the third transmission, the fourth transmission, and the sixth transmission from the combined TOT to obtain a first time of flight (TOF); comparing the first TOF with the first pre-determined time. In some embodiments, determining the health of the range measurement system based on the difference between the first TOT and the first pre-determined time includes determining that the range measurement system is calibrated between the first MCU/CPU to the second MCU/CPU through the first and second antennas when the difference between the first TOF and the first pre-determined time is less than a threshold. In some embodiments, determining the health of the range measurement system based on the difference between the first TOT and the first pre-determined time includes determining that the range measurement system is not calibrated between the first MCU/CPU to the second MCU/CPU through the first and second antennas when the difference between the first TOF and the first pre-determined time is greater than a threshold, and wherein the method further includes: determining a scaling factor, wherein the first TOF multiplied by the scaling factor is equal to the first pre-determined time.

In some embodiments, the method further includes: measuring a second TOT between the first internal component of the on-board range measurement device and the second internal component of the wayside range measurement device via a first signal route; measuring a third TOT between the first internal component of the on-board range measurement device and the second internal component of the wayside range measurement device via a second signal route that is different than the first signal route; comparing a difference between the second TOT and the third TOT with a threshold; and determining a health of the range measurement system based on the difference between and the second TOT and the third TOT and the threshold. In some embodiments, the first signal route is through a first antenna and the second signal route is through a second antenna. In some embodiments, the method further includes: measuring a second TOT between the first internal component of the on-board range measurement device and a third internal component of a second on-board range measurement device, wherein a coaxial cable is connected between the first internal component and the third internal component; comparing the second TOT with a second pre-determined time; and determining the health of the range measurement system based on a difference between the second TOT and the second pre-determined time. In some embodiments, the second pre-determined time is an expected time of propagation for a coaxial cable having a same length as the coaxial cable and wherein determining the health of the range measurement system includes comparing the second TOT with the expected time of propagation. In some embodiments, the method further includes: raising an alarm in response to the difference between the TOT and the pre-determined time being greater than a threshold. In some embodiments, the method further includes: calibrating the range measurement system in response to the difference between the first TOT and the first pre-determined time being greater than a threshold.

A method of calibrating a range measurement system for a guideway mounted device, the method including: measuring a first time of travel TOT between a first internal component of a first on-board range measurement device and a second internal component of a second on-board range measurement device, wherein a coaxial cable is connected between the first on-board range measurement device and second on-board range measurement device; comparing the first TOT with a first pre-determined time; and determining a health of the range measurement system based on a difference between the first TOT and the first pre-determined time. In some embodiments, the first pre-determined time is an expected time of propagation for a coaxial cable having a same length as the coaxial cable and wherein determining the health of the range measurement system includes comparing the first TOT with the expected time of propagation. In some embodiments, comparing the first TOT with the expected time of propagation includes: subtracting a processing time of the second on-board range measurement device from the first TOT to obtain a time of propagation through the coaxial cable; comparing the time of propagation with the expected time of propagation.

A range measurement system for a guideway mounted device, including: a first antenna; a first wireless device operably associated with the first antenna and configured to generate a first signal; a non-transitory computer readable medium configured to store computer executable instructions; at least one microcontroller or central processing unit (MCU/CPU) operably associated with the first wireless device and the non-transitory computer readable medium, wherein, when the at least one MCU/CPU executes the computer executable instructions, the at least one MCU/CPU is configured to: measure a first time of transmission (TOT) between the at least one MCU/CPU and an internal component of a wayside range measurement device; compare the first TOT with a first pre-determined time; and determine a health of the range measurement system based on a difference between the first TOT and the first pre-determined time. In some embodiments, the internal component is a second CPU or second MCU (second MCU/CPU). In some embodiments, the at least one MCU/CPU is configured to measure the first TOT by: transmitting a first signal from the MCU/CPU to a first antenna (first transmission) transmitting the first signal from the transmitting the first signal wirelessly from the first antenna to a second antenna (second transmission); transmitting the first signal from the second antenna to the second MCU/CPU (third transmission); transmitting a second signal from the second MCU/CPU to the second antenna (fourth transmission); transmitting the second signal wirelessly from the second antenna to the first antenna (fifth transmission); transmitting the second signal from the first antenna to the MCU/CPU (sixth transmission); measuring a combined TOT of first transmission, the second transmission, the third transmission, the fourth transmission, the fifth transmission, and the sixth transmission as the first TOT. In some embodiments, the at least one MCU/CPU is configured to compare the first TOT with the first pre-determined time by: subtracting at total time of travel of first transmission, the third transmission, the fourth transmission, and the sixth transmission from the combined TOT to obtain a first time of flight (TOF); comparing the first TOF with the first pre-determined time. In some embodiments, the at least one MCU/CPU is configured to determine the health of the range measurement system based on the difference between the first TOT and the first pre-determined time by determining that the range measurement system is calibrated between the MCU/CPU to the second MCU/CPU through the first and second antennas when the difference between the first TOF and the first pre-determined time is less than a threshold.

In some embodiments, a method of calibrating a range measurement system for a vehicle mounted on a guideway includes: measuring a first time of transmission (TOT) between a first internal component of a first wayside range measurement device and a second internal component of a second wayside range measurement device; comparing the first TOT with a first pre-determined time; and determining a health of the range measurement system based on a difference between the first TOT and the first pre-determined time. In some embodiments, the method further includes: measuring a second TOT between the first internal component of the first wayside range measurement device and a third internal component of a third wayside range measurement device; measuring a third TOT between the second internal component of the second wayside range measurement device and the third internal component of the third wayside range measurement device; comparing the second TOT with a second pre-determined time; comparing the third TOT with a third pre-determined time; and wherein the determining the health of the range measurement system is based on the difference between the first TOT and the first pre-determined time, a difference between the second TOT and the second pre-determined time, and a difference between the third TOT and the third pre-determined time.

In some embodiments, a method of calibrating a range measurement system for a vehicle mounted on a guideway, the method including: measuring a first time of transmission (TOT) between a first internal component of a first on-board range measurement device and a second internal component of a second on-board range measurement device; comparing the first TOT with a first pre-determined time; and determining a health of the range measurement system based on a difference between the first TOF and the first pre-determined time.

In some embodiments, a method of calibrating a range measurement system for a guideway mounted device, the method including: measuring a first time of travel (TOT) between a first internal component of a first wayside range measurement device and a second internal component of a second wayside range measurement device, wherein a coaxial cable is connected between the first wayside range measurement device and second wayside range measurement device; comparing the first TOT with a first pre-determined time; and determining a health of the range measurement system based on a difference between the first TOT and the first pre-determined time. In some embodiments, the first pre-determined time is an expected time of propagation for a coaxial cable having a same length as the coaxial cable and wherein determining the health of the range measurement system comprises comparing the first TOT with the expected time of propagation. In some embodiments, comparing the first TOT with the expected time of propagation includes: subtracting a processing time of the second wayside range measurement device from the first TOT to obtain a time of propagation through the coaxial cable; comparing the time of propagation with the expected time of propagation.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

What is claimed is:

1. A method of calibrating a range measurement system for a vehicle mounted on a guideway, the method comprising:
   measuring a first time of transmission (TOT) between a first internal component of an on-board range measurement device and a second internal component of a wayside range measurement device;
   comparing the first TOT with a first pre-determined time; and
   determining a health of the range measurement system based on a difference between the first TOT and the first pre-determined time, wherein the first internal component is a first central processing unit (CPU) or first microcontroller unit (MCU) (first MCU/CPU) and the second internal component is a second CPU or second MCU (second MCU/CPU), wherein measuring the first TOT comprises:
      transmitting a first signal from the first MCU/CPU to a first antenna (first transmission);
      transmitting the first signal from the transmitting the first signal wirelessly from the first antenna to a second antenna (second transmission);
      transmitting the first signal from the second antenna to the second MCU/CPU (third transmission);
      transmitting a second signal from the second MCU/CPU to the second antenna (fourth transmission);
      transmitting the second signal wirelessly from the second antenna to the first antenna (fifth transmission);
      transmitting the second signal from the first antenna to the first MCU/CPU (sixth transmission);
      measuring a combined TOT of first transmission, the second transmission, the third transmission, the fourth transmission, the fifth transmission, and the sixth transmission as the first TOT.

2. The method of claim 1, wherein comparing the first TOT with the first pre-determined time, comprises:
   subtracting a total time of travel of first transmission, the third transmission, the fourth transmission, and the sixth transmission from the combined TOT to obtain a first time of flight (TOF);
   comparing the first TOF with the first pre-determined time.

3. The method of claim 2, wherein determining the health of the range measurement system based on the difference between the first TOT and the first pre-determined time comprises determining that the range measurement system is calibrated between the first MCU/CPU to the second MCU/CPU through the first and second antennas when the difference between the first TOF and the first pre-determined time is less than a threshold.

4. The method of claim 2, wherein determining the health of the range measurement system based on the difference between the first TOT and the first pre-determined time comprises determining that the range measurement system is not calibrated between the first MCU/CPU to the second MCU/CPU through the first and second antennas when the difference between the first TOF and the first pre-determined time is greater than a threshold, and wherein the method further comprises:
   determining a scaling factor, wherein the first TOF multiplied by the scaling factor is equal to the first pre-determined time.

5. The method of claim 1, further comprising:
   measuring a second TOT between the first internal component of the on-board range measurement device and the second internal component of the wayside range measurement device via a first signal route;
   measuring a third TOT between the first internal component of the on-board range measurement device and the second internal component of the wayside range measurement device via a second signal route that is different than the first signal route;
   comparing a difference between the second TOT and the third TOT with a threshold; and
   determining a health of the range measurement system based on the difference between and the second TOT and the third TOT and the threshold.

6. The method of claim 5, wherein the first signal route is through a first antenna and the second signal route is through a second antenna.

7. The method of claim 1, further comprising:
   measuring a second TOT between the first internal component of the on-board range measurement device and a third internal component of a second on-board range measurement device, wherein a coaxial cable is connected between the first internal component and the third internal component;
   comparing the second TOT with a second pre-determined time; and
   determining the health of the range measurement system based on a difference between the second TOT and the second pre-determined time.

8. The method of claim 7, wherein the second pre-determined time is an expected time of propagation for a coaxial cable having a same length as the coaxial cable and wherein determining the health of the range measurement system comprises comparing the second TOT with the expected time of propagation.

9. The method of claim 1, further comprising:
   raising an alarm in response to the difference between the TOT and the pre-determined time being greater than a threshold.

10. The method of claim 1, further comprising:
    calibrating the range measurement system in response to the difference between the first TOT and the first pre-determined time being greater than a threshold.

11. A range measurement system for a guideway mounted device, comprising:
    a first antenna;
    a first wireless device operably associated with the first antenna and configured to generate a first signal;
    a non-transitory computer readable medium configured to store computer executable instructions;

at least one microcontroller or central processing unit (MCU/CPU) operably associated with the first wireless device and the non-transitory computer readable medium, wherein, when the at least one MCU/CPU executes the computer executable instructions, the at least one MCU/CPU is configured to:

measure a first time of transmission (TOT) between the at least one MCU/CPU and an internal component of a wayside range measurement device;

compare the first TOT with a first pre-determined time; and determine a health of the range measurement system based on a difference between the first TOT and the first pre-determined time, wherein the internal component is a second CPU or second MCU (second MCU/CPU), wherein the at least one MCU/CPU is configured to measure the first TOT by:

transmitting a first signal from the MCU/CPU to a first antenna (first transmission)

transmitting the first signal from the transmitting the first signal wirelessly from the first antenna to a second antenna (second transmission);

transmitting the first signal from the second antenna to the second MCU/CPU (third transmission);

transmitting a second signal from the second MCU/CPU to the second antenna (fourth transmission);

transmitting the second signal wirelessly from the second antenna to the first antenna (fifth transmission);

transmitting the second signal from the first antenna to the MCU/CPU (sixth transmission);

measuring a combined TOT of first transmission, the second transmission, the third transmission, the fourth transmission, the fifth transmission, and the sixth transmission as the first TOT.

12. The range measurement system of claim 6, wherein the at least one MCU/CPU is configured to compare the first TOT with the first pre-determined time by:

subtracting at total time of travel of first transmission, the third transmission, the fourth transmission, and the sixth transmission from the combined TOT to obtain a first time of flight (TOF);

comparing the first TOF with the first pre-determined time.

13. The range measurement system of claim 12, wherein the at least one MCU/CPU is configured to determine the health of the range measurement system based on the difference between the first TOT and the first pre-determined time by determining that the range measurement system is calibrated between the MCU/CPU to the second MCU/CPU through the first and second antennas when the difference between the first TOF and the first pre-determined time is less than a threshold.

14. A method of calibrating a range measurement system for a vehicle mounted on a guideway, the method comprising:

measuring a first time of transmission (TOT) between a first internal component of a first wayside range measurement device and a second internal component of a second wayside range measurement device;

comparing the first TOT with a first pre-determined time; and determining a health of the range measurement system based on a difference between the first TOT and the first pre-determined time;

measuring a second TOT between the first internal component of the first wayside range measurement device and a third internal component of a third wayside range measurement device;

measuring a third TOT between the second internal component of the second wayside range measurement device and the third internal component of the third wayside range measurement device;

comparing the second TOT with a second pre-determined time;

comparing the third TOT with a third pre-determined time; and wherein the determining the health of the range measurement system is based on the difference between the first TOT and the first pre-determined time, a difference between the second TOT and the second pre-determined time, and a difference between the third TOT and the third pre-determined time.

* * * * *